United States Patent
Record et al.

(10) Patent No.: US 12,405,384 B2
(45) Date of Patent: Sep. 2, 2025

(54) SYSTEMS AND METHODS FOR DETERMINING AN ARTICULATED TRAILER ANGLE

(71) Applicant: Outrider Technologies, Inc., Brighton, CO (US)

(72) Inventors: Jonathan Record, Brighton, CO (US); Robert Grabbe, Brighton, CO (US); Lawrence Klein, Bend, OR (US); Floyd Henning, Arvada, CO (US)

(73) Assignee: Outrider Technologies, Inc., Brighton, CO (US)

( * ) Notice: Subject to any disclaimer, the term of this patent is extended or adjusted under 35 U.S.C. 154(b) by 0 days.

(21) Appl. No.: 18/599,915

(22) Filed: Mar. 8, 2024

(65) Prior Publication Data
US 2024/0219575 A1 Jul. 4, 2024

Related U.S. Application Data

(63) Continuation of application No. 17/848,188, filed on Jun. 23, 2022, now Pat. No. 11,927,676.
(Continued)

(51) Int. Cl.
*G01S 17/931* (2020.01)
*B60R 1/00* (2022.01)
(Continued)

(52) U.S. Cl.
CPC ............ *G01S 17/931* (2020.01); *B60R 1/003* (2013.01); *G01B 11/26* (2013.01); *G01D 5/264* (2013.01);
(Continued)

(58) Field of Classification Search
CPC ...... G01S 17/931; G01S 7/4808; G01S 17/89; B60R 1/003; B60R 2300/105;
(Continued)

(56) References Cited

U.S. PATENT DOCUMENTS 5,152,544 A   10/1992  Dierker et al.
7,976,051 B1   7/2011  Laster et al.
(Continued)

FOREIGN PATENT DOCUMENTS

CN   208765700 U   4/2019
CN   111163952 A   5/2020
(Continued)

OTHER PUBLICATIONS

International Patent Application No. PCT/US22/34773 International Search Report and Written Opinion dated Nov. 17, 2022, 13 pages.
(Continued)

*Primary Examiner* — Md M Rahman
(74) *Attorney, Agent, or Firm* — Cozen O'Connor

(57) ABSTRACT

Systems and methods determine an angle of an articulated trailer relative to a tractor that the trailer is hitched to. An encoder is positioned beneath a fifth-wheel of a tractor to couples with a kingpin of the trailer when the trailer is hitched to the tractor. The coupler has a rotating shaft that may include pins that physically interact with the kingpin and/or may include a magnet that magnetically attaches to the kingpin. A clearance and cleaning block may be positioned on the spring plate to interact with a bottom surface of a kingpin of the trailer during hitching of the trailer to the tractor. A LIDAR attached to the tractor may detect a front end of the trailer to determine the trailer angle relative to the tractor.

20 Claims, 16 Drawing Sheets

Related U.S. Application Data

(60) Provisional application No. 63/327,723, filed on Apr. 5, 2022, provisional application No. 63/214,227, filed on Jun. 23, 2021.

(51) Int. Cl.
  *B60W 60/00* (2020.01)
  *B62D 53/08* (2006.01)
  *G01B 11/26* (2006.01)
  *G01D 5/26* (2006.01)

(52) U.S. Cl.
  CPC ........ *B60R 2300/105* (2013.01); *B60W 60/00* (2020.02); *B60W 2300/145* (2013.01); *B62D 53/0842* (2013.01)

(58) Field of Classification Search
  CPC ....... G01B 11/26; G01D 5/264; B60W 60/00; B60W 2300/145; B62D 53/0842; B62D 13/06; B62D 15/023; B60D 1/015; B60D 1/62
  USPC ...................................................... 356/5.01
  See application file for complete search history.

(56) References Cited

U.S. PATENT DOCUMENTS

| | | |
|---|---|---|
| 2004/0017285 A1 | 1/2004 | Zielinski et al. |
| 2013/0082453 A1 | 4/2013 | Padula |
| 2017/0361844 A1* | 12/2017 | Kahn ...................... G01B 11/24 |
| 2018/0057052 A1* | 3/2018 | Dodd ...................... B60D 1/015 |
| 2019/0039425 A1 | 2/2019 | Dodd et al. |
| 2019/0064835 A1 | 2/2019 | Hoofard et al. |
| 2020/0097021 A1 | 3/2020 | Carpenter et al. |
| 2021/0245747 A1 | 8/2021 | Naithani et al. |
| 2021/0356261 A1* | 11/2021 | Jin .......................... G01S 17/06 |
| 2022/0242319 A1* | 8/2022 | O'Keeffe ................ G01S 7/497 |

FOREIGN PATENT DOCUMENTS

| | | |
|---|---|---|
| CN | 111655518 A | 9/2020 |
| DE | 4021717 A1 | 1/1992 |
| WO | 2019092209 A1 | 5/2019 |
| WO | 2019101848 A1 | 5/2019 |
| WO | 2020248035 A1 | 12/2020 |

OTHER PUBLICATIONS

Notice of Decision to Grant Patent for Chinese Patent Application No. 202280056792.7, mailed Jan. 2, 2025, 5 pages.
Extended European Search Report for European Application No. 22829324.7, dated Mar. 27, 2025, 8 pages.
Extended European Search Report for European Patent Application No. 22829317.1 dated Feb. 4, 2025, 9 pages.

* cited by examiner

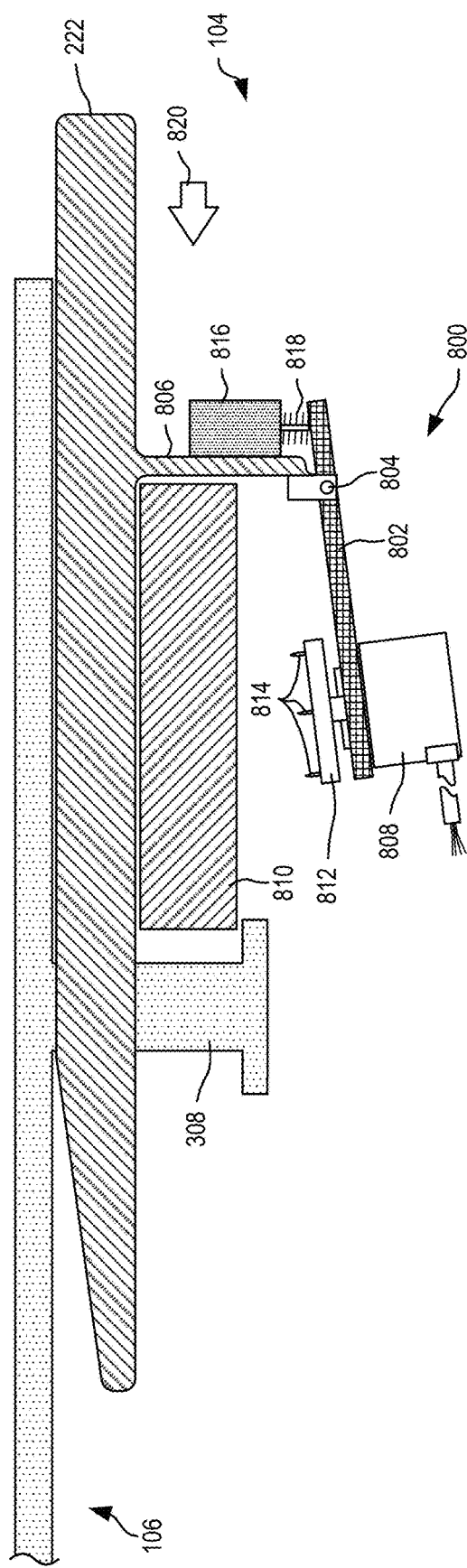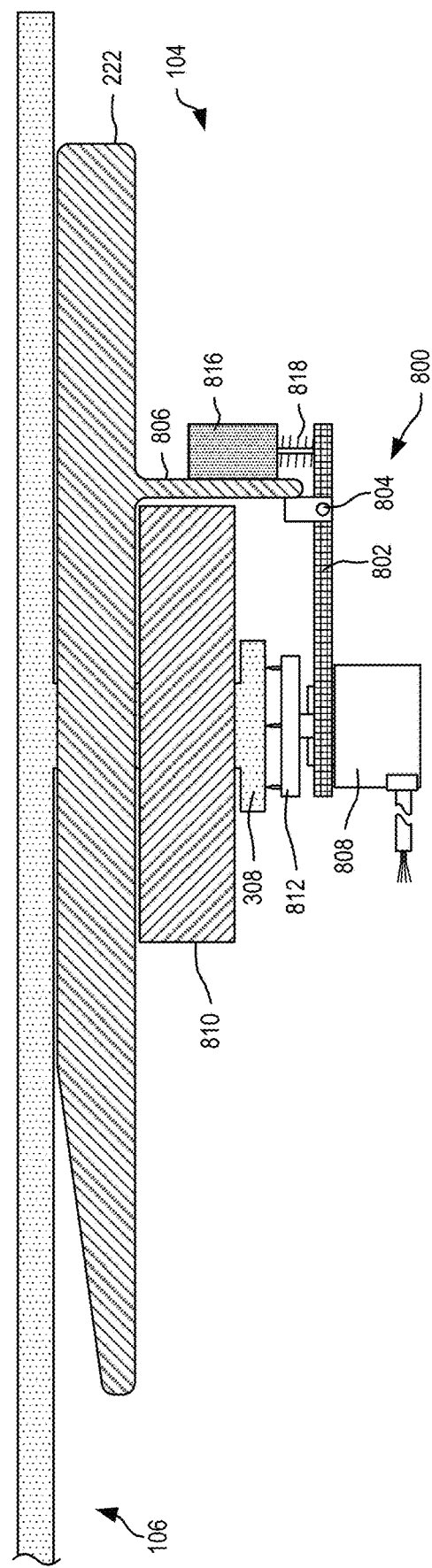

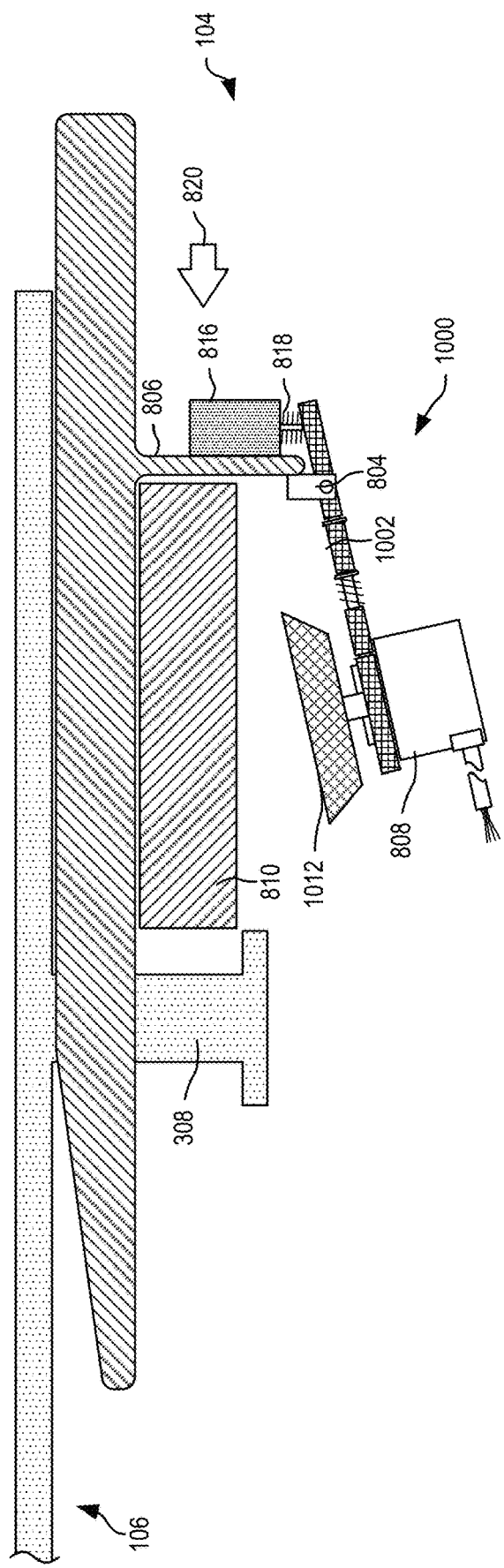

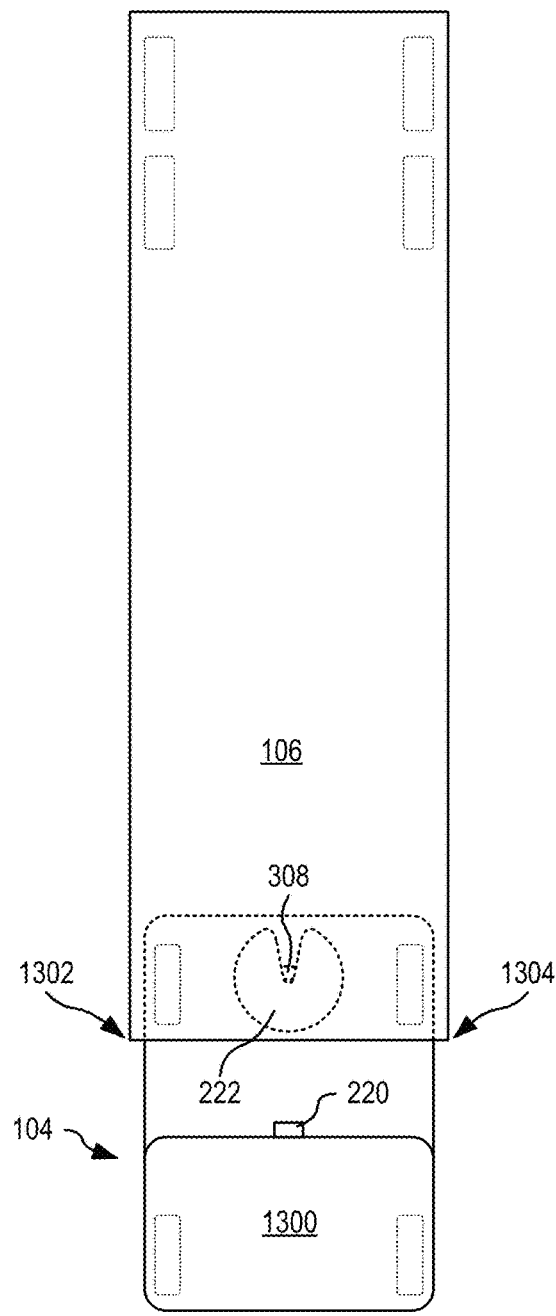
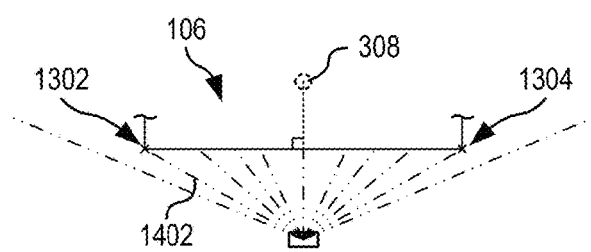
FIG. 14
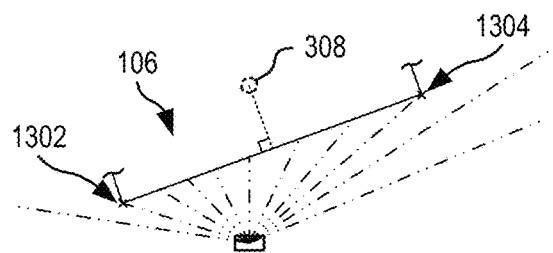
FIG. 15
FIG. 13

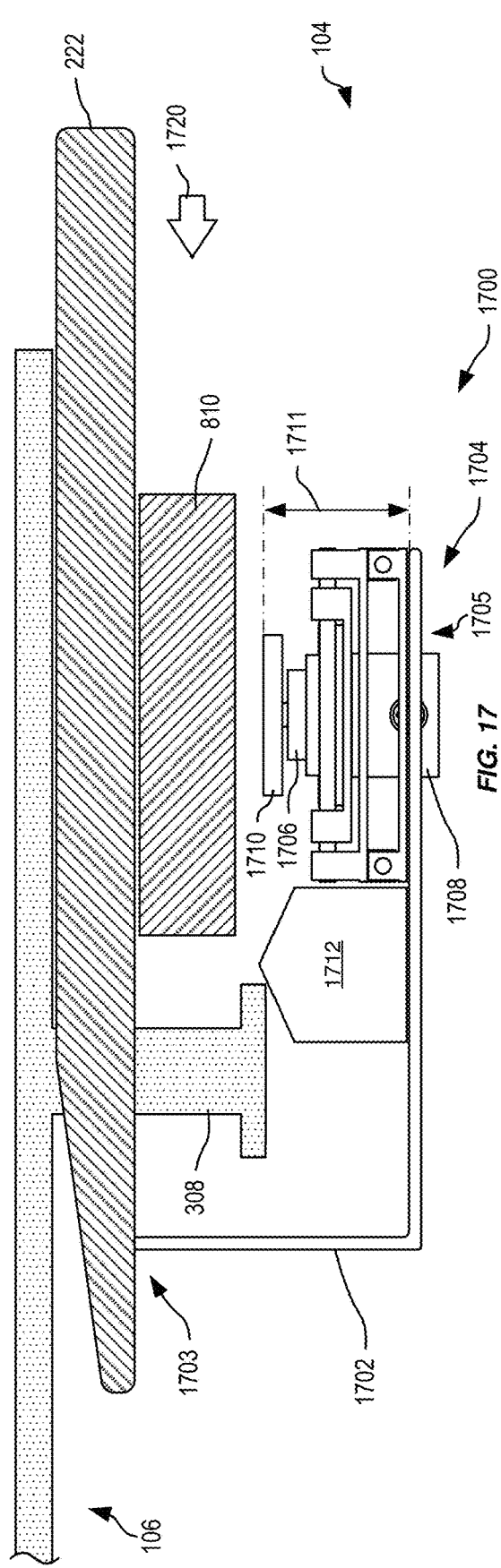
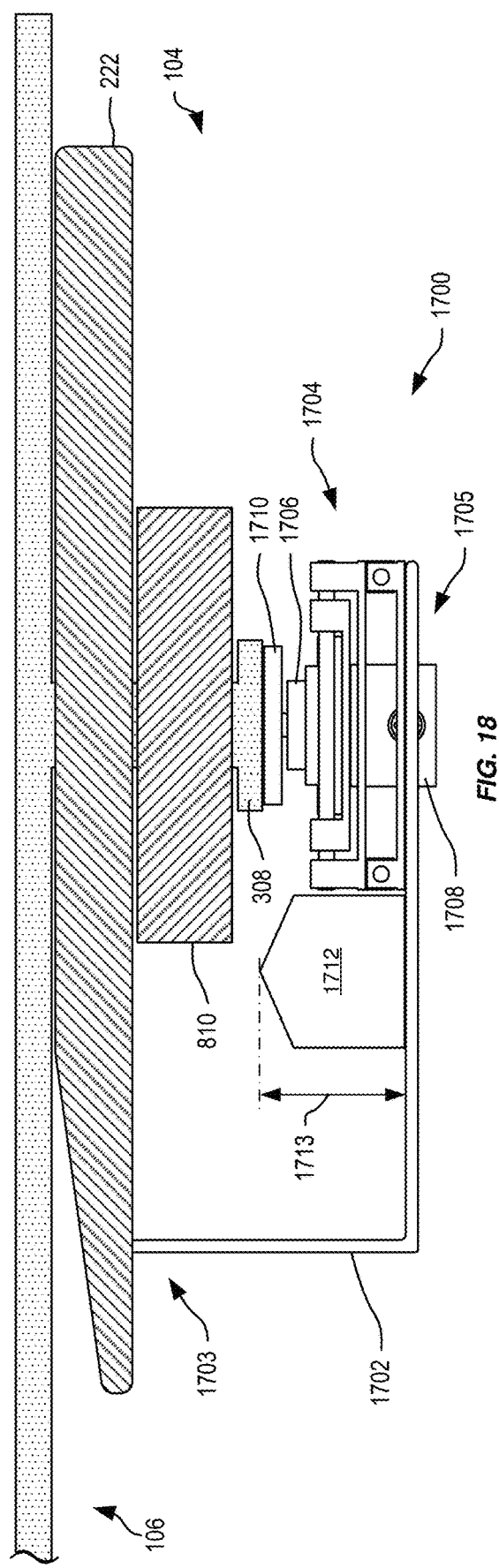

SYSTEMS AND METHODS FOR DETERMINING AN ARTICULATED TRAILER ANGLE

RELATED APPLICATIONS

This patent application is a continuation of U.S. patent application Ser. No. 17/848,188, filed Jun. 23, 2022, which claims priority to U.S. Provisional Patent Application No. 63/214,227, filed on Jun. 23, 2021, and claims priority to U.S. Provisional Patent Application No. 63/327,723, filed on Apr. 5, 2022. The disclosure of each of the prior applications is incorporated herein by reference in its entirety.

BACKGROUND

Trucks are an essential part of modern commerce. These trucks transport materials and finished goods across the continent within their large interior spaces. Such goods are loaded and unloaded at various facilities that can include manufacturers, ports, distributors, retailers, and end users. The start and end locations are referred to as "yards" and include areas that trailers are parked (and/or staged) and moved to and from for access by tractors (trucks) for loading to a dock door for loading/unloading cargo into the associated facility, leaving the yard for travel to its destination, or entering the yard from its destination. Autonomous yard vehicles technology includes tractors (trucks) that are capable of automatically (without human intervention, or with human intervention via teleoperation) coupling, decoupling, and maneuvering trailers that are within the yard.

Safety is of upmost importance in such automated yards. The automatic maneuvering of said trailers results in situations where, if a person or other obstacle is in the intended path of the trailer or tractor, because there is no human operating the tractor, there are situations where the tractor may not know of a human or obstacle. Thus, additional sensors are desired so that the controller of the automated tractor can maneuver the trailers safely.

Additional difficulties arise because various manufactures and freight companies have their own trailers. Thus, while an automated yard vehicle may have associated sensors, it is difficult to utilize sensors on the trailers themselves because it requires human (or machine) intervention on the trailer prior to maneuvering the trailer. This additional intervention step is timely and creates an additional location for safety concern.

SUMMARY

Trucks are an essential part of modern commerce. These trucks transport materials and finished goods across the continent within their large interior spaces. Such goods are loaded and unloaded at various facilities that can include manufacturers, ports, distributors, retailers, and end users. Large over-the road (OTR) trucks typically consist of a tractor or cab unit and a separate detachable trailer that is interconnected removably to the cab via a hitching system that consists of a so-called fifth wheel and a kingpin.

Further challenges in trucking relate to docking, loading and unloading of goods to and from trailers. Warehouses and good distribution facilities have yards with multiple loading docks, and the trailer is positioned at one of the loading docks for loading and unloading. In an automated yard, the OTR truck stops at a designated location in staging area of the yard, and the OTR tractor detaches, leaving the trailer at the designated location. An autonomous tractor moves the trailer to a first one of the loading docks for unloading and/or loading. Another, or the same, autonomous tractor moves the trailer away from the loading dock when loading and/or unloading is complete and parks the trailer in a designated location of the staging area. The trailer may also be moved between loading docks if needed by another, or the same, autonomous tractor. Another, or the same, OTR tractor couples with the trailer and the OTR truck departs the yard for another destination.

One aspect of the present embodiments includes the realization that for an autonomous tractor to reverse an articulated trailer accurately and safely into a designated location, such as a loading dock, the autonomous tractor requires accurate knowledge of a position and/or location and/or orientation of the back end of the articulated trailer always. However, the articulated trailer does not have sensors for determining this information. The present embodiments solve this problem by determining an angle between the articulated trailer and the autonomous tractor, and then extrapolating a location of the back end of the articulated trailer based on a location of the autonomous tractor, an orientation of the autonomous tractor, a length of the articulated trailer and the angle between the articulated trailer and the autonomous tractor.

In certain embodiments, a trailer angle encoder for determining an angle between a tractor and a trailer coupled thereto includes an arm coupled at a pivot with a flange located beneath a fifth-wheel of the tractor and an optical encoder positioned at a first end of the arm and having a rotatable shaft with a mechanical coupler. The arm being positioned to mechanically couple the mechanical coupler with a kingpin of the trailer.

In certain embodiments, a method for determining an angle between a tractor and a trailer that are coupled together includes: controlling, from a controller of the tractor, the tractor to pull the trailer a short distance; determining, from an optical encoder mounted on the tractor and mechanically coupled with the trailer, a change in angle between the tractor and the trailer; and calculating the angle between the tractor and the trailer based on the change in angle.

In certain embodiments, a trailer angle encoder for determining an angle between a tractor and a trailer coupled thereto includes a spring plate for coupling at a first end with an underside of a fifth-wheel of the tractor, an optical encoder attached to the spring plate, a magnet mounted to a rotatable shaft of the optical encoder, and a clearance and cleaning block positioned on the spring plate to interact with a bottom surface of a kingpin of the trailer during hitching of the tractor to the trailer; wherein the magnet magnetically couples with the bottom surface of the kingpin when the tractor is hitched to the trailer.

In certain embodiments, a software product includes instructions, stored on non-transitory computer-readable media, wherein the instructions, when executed by a processor, perform steps for determining an angle between a tractor and a trailer that are coupled together, the software product including instructions for controlling, from a controller of the tractor, the tractor to pull the trailer a short distance; instructions for determining, from an optical encoder mounted on the tractor and mechanically coupled with the trailer, a change in angle between the tractor and the trailer; and instructions for calculating the angle between the tractor and the trailer based on the change in angle.

In certain embodiments, a method for determining an angle between a tractor and a trailer that are coupled together includes: capturing, within a controller of the tractor, a point cloud using a rear facing LIDAR positioned on the tractor;

converting points of the point cloud corresponding to front corners of the trailer to coordinate form; and calculating the angle between the tractor and the trailer based upon the coordinates of the front corners of the trailer.

In certain embodiments, a software product includes instructions, stored on non-transitory computer-readable media, wherein the instructions, when executed by a processor, perform steps for determining an angle between a tractor and a trailer that are coupled together, the software product including instructions for capturing, within a controller of the tractor, a point cloud using a rear facing LIDAR positioned on the tractor; instructions for converting points of the point cloud corresponding to front corners of the trailer to coordinate form; and instructions for calculating the angle between the tractor and the trailer based upon the coordinates of the front corners of the trailer.

BRIEF DESCRIPTION OF THE FIGURES

FIG. 8 is a schematic diagram showing one example trailer angle encoder positioned beneath the FW of the tractor of FIGS. 1-3 and in a disengaged position as the tractor couples with the trailer, in embodiments.

FIG. 9 is a schematic showing the trailer angle encoder of FIG. 8 in an engaged position to mechanically couple with the kingpin of the trailer while the tractor and trailer are coupled together, in embodiments.

FIGS. 10-12 are schematic diagrams showing another example trailer angle encoder positioned beneath the FW of the tractor of FIGS. 1-3, in embodiments.

FIG. 13 shows the LIDAR of FIG. 2 mounted on a cab portion of the tractor to face the trailer, in embodiments.

FIG. 14 is a schematic illustrating example operation of the LIDAR of FIG. 13 to detect front corners of the trailer when the trailer is in-line with the tractor, in embodiments.

FIG. 15 is a schematic illustrating example operation of the LIDAR of FIG. 13 to detect the front corners of the trailer when the trailer is at a twenty-degree angle to the tractor, in embodiments.

FIG. 17 is a schematic diagram showing one example magnetically coupled trailer angle encoder positioned beneath the FW of the tractor prior to the tractor coupling (hitching) with the trailer, in embodiments.

FIG. 18 is a schematic showing the magnetically coupled trailer angle encoder of FIG. 17 magnetically coupled with the kingpin of the trailer hitched to the tractor, in embodiments.

DETAILED DESCRIPTION OF THE EMBODIMENTS

In an automated yard, an autonomous tractor moves trailers between staging areas and loading docks for unloading and/or loading. The autonomous tractor repeatedly couples (hitches) to a trailer, moves the trailer, and then decouples (unhitches) from the trailer.

Figure 1:
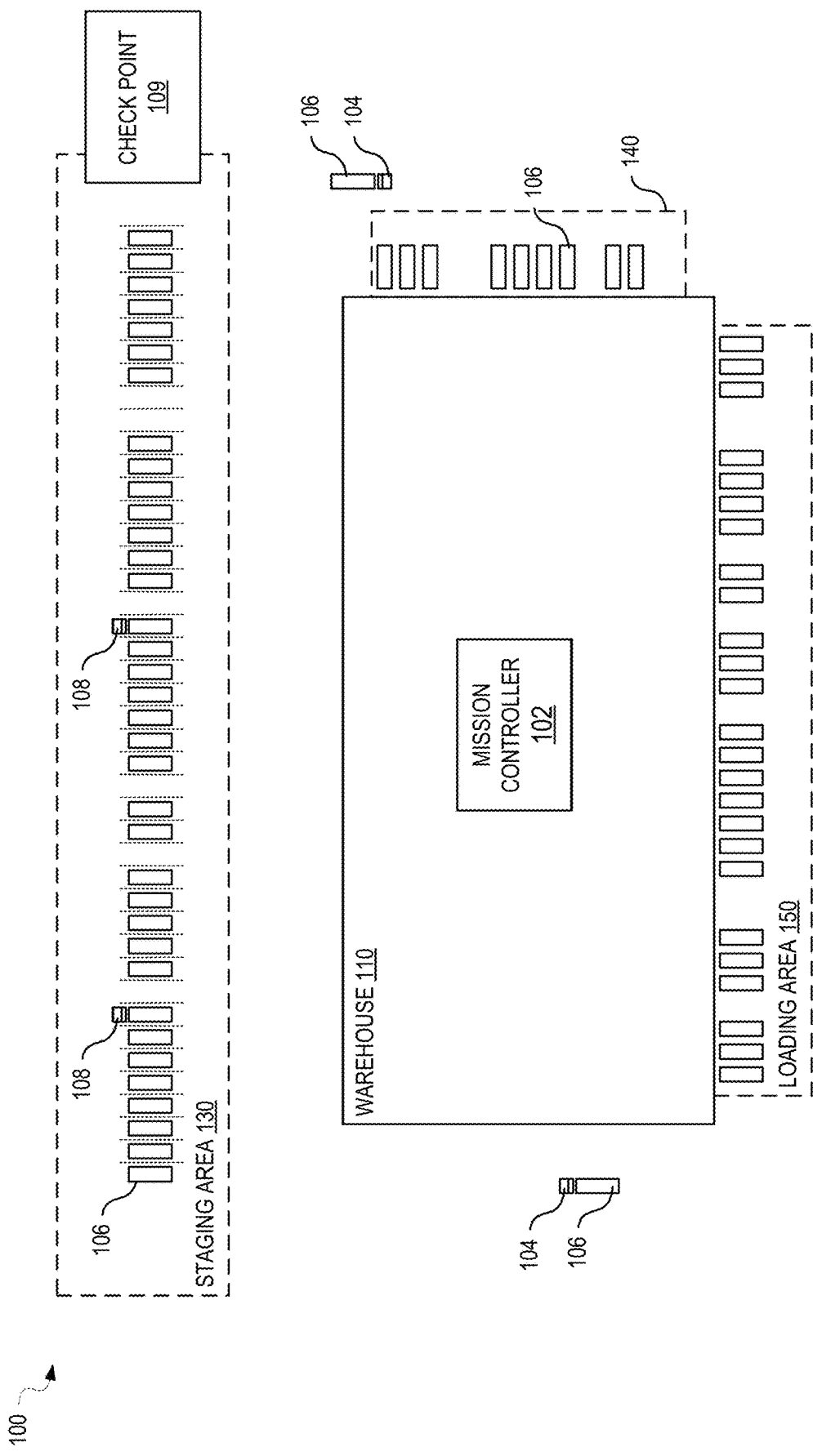
FIG. 1 is an aerial view showing one example autonomous yard that uses an autonomous tractor to move trailers between a staging area and loading docks of a warehouse, in embodiments.

FIG. 1 is an aerial view showing one example autonomous yard 100 (e.g., a goods handling facility, shipping facility, etc.) that uses an autonomous tractor 104 to move trailers 106 between a staging area 130 and loading docks of a warehouse 110. For example, an over-the-road (OTR) tractors 108 deliver goods-laden trailers 106 from remote locations and retrieve trailers 106 for return to such locations (or elsewhere-such as a storage depot). In a standard operational procedure, OTR tractor 108 arrives with trailer 106 and checks-in at a facility entrance checkpoint 109. A guard/attendant enters information (e.g., trailer number or QR (ID) code scan-embedded information already in the system, which would typically include: trailer make/model/ year/service connection location, etc.) into a mission controller 102 (e.g., a computer software server that may be located offsite, in the cloud, fully onsite, or partially located within a facility building complex, shown as a warehouse 110). Warehouse 110 includes perimeter loading docks (located on one or more sides of the building), associated (typically elevated) cargo portals and doors, and floor storage, all arranged in a manner familiar to those of skill in shipping, logistics, and the like.

By way of a simplified operational example, after arrival of OTR tractor 108 and trailer 106, the guard/attendant at checkpoint 109 directs the driver to deliver trailer 106 to a specific numbered parking space in a designated staging area 130, which may include a large array of side-by-side trailer parking locations, arranged as appropriate for the facility's overall layout.

Once the driver has parked the trailer in the designated parking space of the staging area 130, he/she disconnects the service lines and ensures that connectors are in an accessible position (i.e. if adjustable/sealable), and decouples OTR tractor 108 from trailer 106. If trailer 106 is equipped with swing doors, this can also provide an opportunity for the driver to unlatch and clip trailer doors in the open position, if directed by yard personnel to do so.

At some later time, (e.g., when warehouse is ready to process the loaded trailer) mission controller 102 directs (e.g., commands or otherwise controls) tractor 104 to automatically couple (e.g., hitch) with trailer 106 at a pick-up spot in staging area 130 and move trailer 106 to a drop-off spot at an assigned unloading dock in unloading area 140 for example. Accordingly, tractor 104 couples with trailer 106 at the pick-up spot, moves trailer 106 to unloading area 140, and then backs trailer 106 into the assigned loading dock at the drop-off spot such that the rear of trailer 106 is positioned in close proximity with the portal and cargo doors of warehouse 110. The pick-up spot and the drop-off spot may be any designated trailer parking location in staging are 130, any loading dock in unloading area 140, and any loading dock within loading area 150.

Manual and/or automated techniques are used to offload the cargo from trailer 106 and into warehouse 110. During unloading, tractor 104 may remain hitched to trailer 106 or may decouple (e.g., unhitch) to perform other tasks. After unloading, mission controller 102 directs tractor 104 to move trailer 106 from a pick-up spot in unloading area 140 and to a drop-off spot, either returning trailer 106 to staging area 130 or delivering trailer 106 to an assigned loading dock in a loading area 150 of warehouse 110, where trailer 106 is then loaded. Once loaded, mission controller 102 directs tractor 104 to move trailer 106 from a pick-up spot in loading area 150 to a drop-off spot in staging area 130 where it may await collection by another (or the same) OTR tractor 108. Given the pick-up spot and the drop-off spot, tractor 104 may autonomously move trailer 106.

Figure 2:
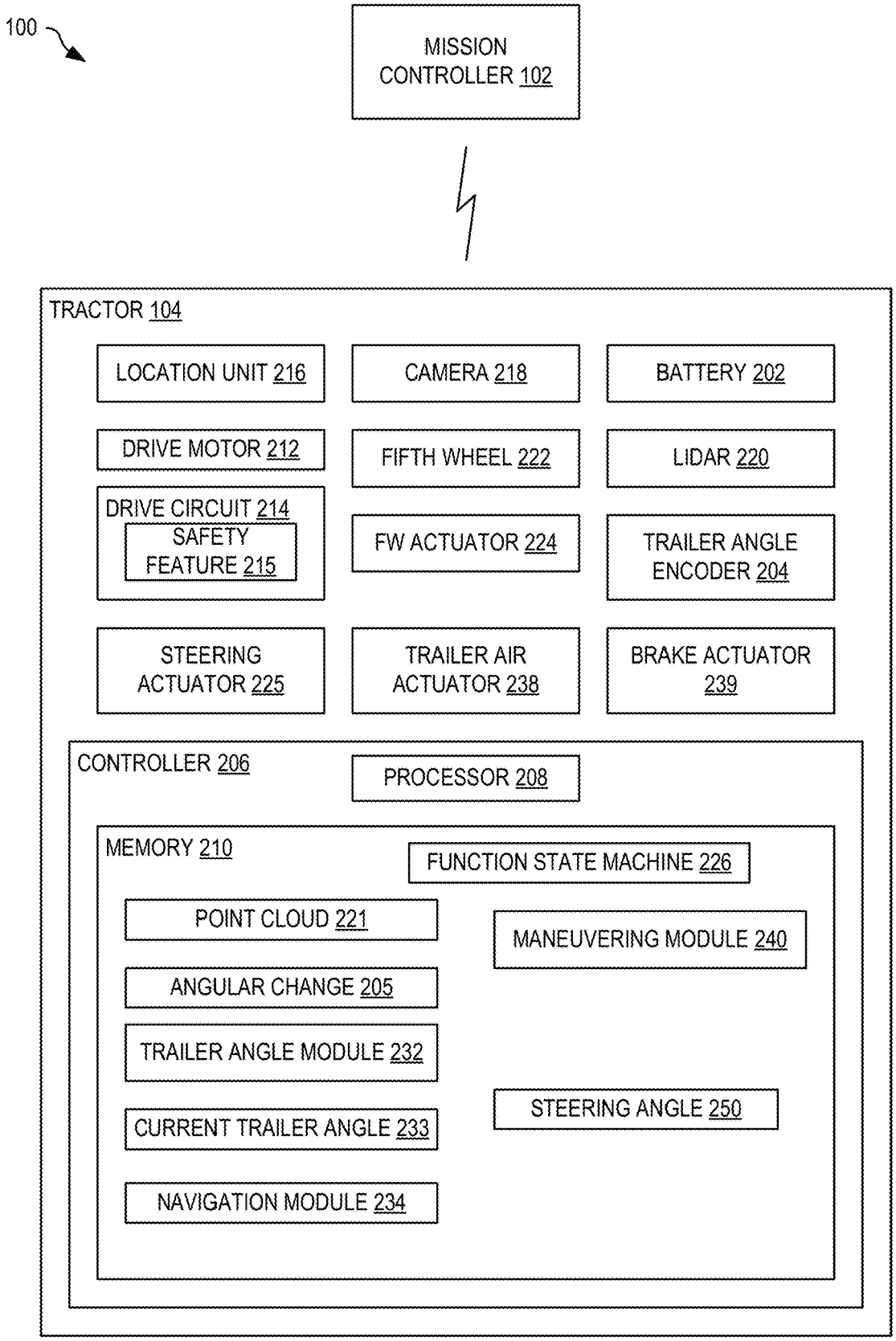
FIG. 2 is a block diagram illustrating key functional components of the autonomous tractor of FIG. 1, in embodiments.

FIG. 2 is a block diagram illustrating key functional components of tractor 104. Tractor 104 includes a battery 202 for powering components of tractor 104 and a controller 206 with at least one digital processor 208 communicatively coupled with memory 210 that may include one or both of volatile memory (e.g., RAM, SRAM, etc.) and non-volatile memory (e.g., PROM, FLASH, Magnetic, Optical, etc.). Memory 210 stores a plurality of software modules including machine-readable instructions that, when executed by the at least one processor 208, cause the at least one processor 208 to implement functionality of tractor 104 as described herein to operate autonomously within autonomous yard 100 under direction from mission controller 102.

When tractor 104 is an electric tractor, tractor 104 also includes at least one drive motor 212 controlled by a drive circuit 214 to mechanically drive a plurality of wheels (not shown) to maneuver tractor 104. Drive circuit 214 includes a safety feature 215 that deactivates motion of tractor 104 when it detects that rotation of drive motor 212 is impeded (e.g., stalled) and that drive motor 212 is drawing a current at or greater than a stalled threshold (e.g., above one of 400A, 500A, 600A, 700A, etc. depending on the configuration of the drive motor 212), for a predetermined period (e.g., five seconds). Safety feature 215 may thereby prevent damage to tractor 104 and/or other objects around tractor 104 when tractor 104 is impeded by an object. Safety feature 215 is described above with respect to an electric tractor. It should be appreciated that a similar safety feature could be included for diesel-based tractors, such as reducing engine power when an RPM threshold goes above a pre-set threshold. When safety feature 215 is tripped, tractor 104 requires manual reactivation before being able to resume movement. Accordingly, tripping safety feature 215 is undesirable.

Tractor 104 also includes a location unit 216 (e.g., a GPS receiver) that determines an absolute location and orientation of tractor 104, a plurality of cameras 218 for capturing images of objects around tractor 104, and at least one Light Detection and Ranging (LIDAR) device 220 (hereinafter LIDAR 220) for determining a point cloud about tractor 104. Location unit 216, the plurality of cameras 218, and the at least one LIDAR 220 cooperate with controller 206 to enable autonomous maneuverability and safety of tractor 104. Tractor 104 includes a fifth wheel (FW) 222 for coupling with trailer 106 and a FW actuator 224 controlled by controller 206 to position FW 222 at a desired height. In certain embodiments, FW actuator 224 includes an electric motor coupled with a hydraulic pump that drives a hydraulic piston that moves FW 222. However, FW actuator 224 may include other devices for positioning FW 222 without departing from the scope hereof. Tractor 104 may also include an air actuator 238 that controls air supplied to trailer 106 and a brake actuator 239 that controls brakes of tractor 104 and trailer 106 when connected thereto via air actuator 238.

Controller 206 also includes a trailer angle module 232 that determines a trailer angle 233 between tractor 104 and trailer 106 based on one or both of a trailer angle measured by an optical encoder 204 positioned near FW 222 and mechanically coupled with trailer 106 and a point cloud 221 captured by the at least one LIDAR 220.

Controller 206 may implement a function state machine 226 that controls operation of tractor 104 based upon commands (requests) received from mission controller 102. For example, mission controller 102 may receive a request (e.g., via an API, and/or via a GUI used by a dispatch operator) to move trailer 106 from a first location (e.g., slot X in staging area 130) to a second location (e.g., loading dock Y in unloading area 140). Once this request is validated, mission controller 102 invokes a mission planner (e.g., a software package, not shown) that computes a 'mission plan' for each tractor 104. For example, the mission plan is an ordered sequence of high level primitives to be followed by tractor 104, in order to move trailer 106 from location X to location Y. The mission plan may include primitives such as drive along a first route, couple with trailer 106 in parking location X, drive along a second route, back trailer 106 into a loading dock, and decouple from trailer 106.

Function state machine 226 includes a plurality of states, each associated with at least one software routine (e.g., machine-readable instructions) that is executed by processor 208 to implements a particular function of tractor 104. Function state machine 226 may transitions through one or more states when following the primitives from mission controller 102 to complete the mission plan.

Controller 206 may also include an articulated maneuvering module 240, implemented as machine-readable instructions that, when executed by processor 208, cause processor 208 to controls drive circuit 214 and steering actuator 225 to maneuver tractor 104 based on directives from mission controller 102.

Controller 206 may also include a navigation module 234 that uses location unit 216 to determine a current location and orientation of tractor 104. Navigation module 234 may also use other sensors (e.g., camera 218 and/or LIDAR 220) to determine the current location and orientation of tractor 104 using dead-reckoning techniques.

Figure 3:
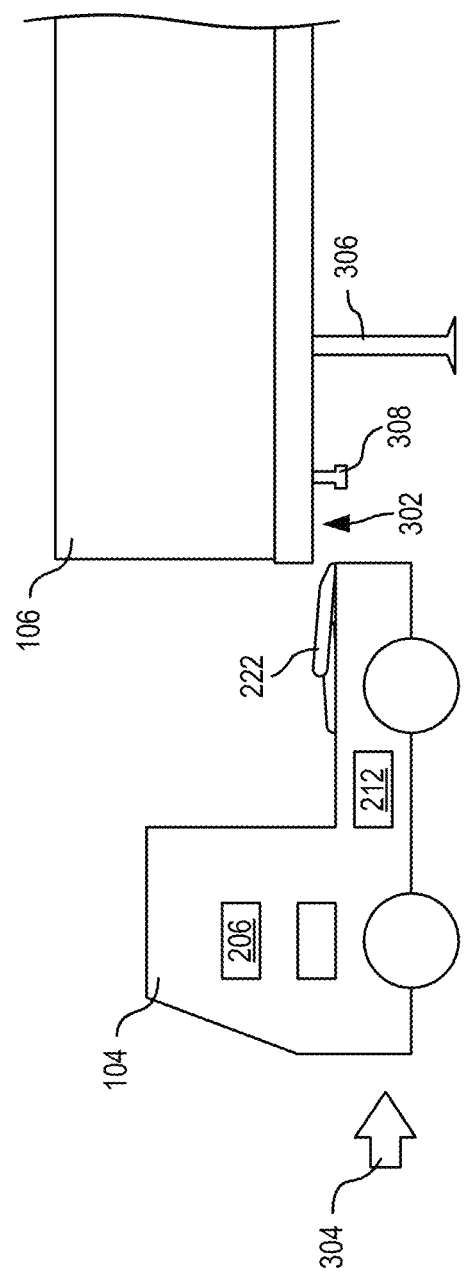
FIG. 3 is a side elevation showing the tractor of FIG. 1 reversing under a lower surface of a trailer, in embodiments.
Figure 4:
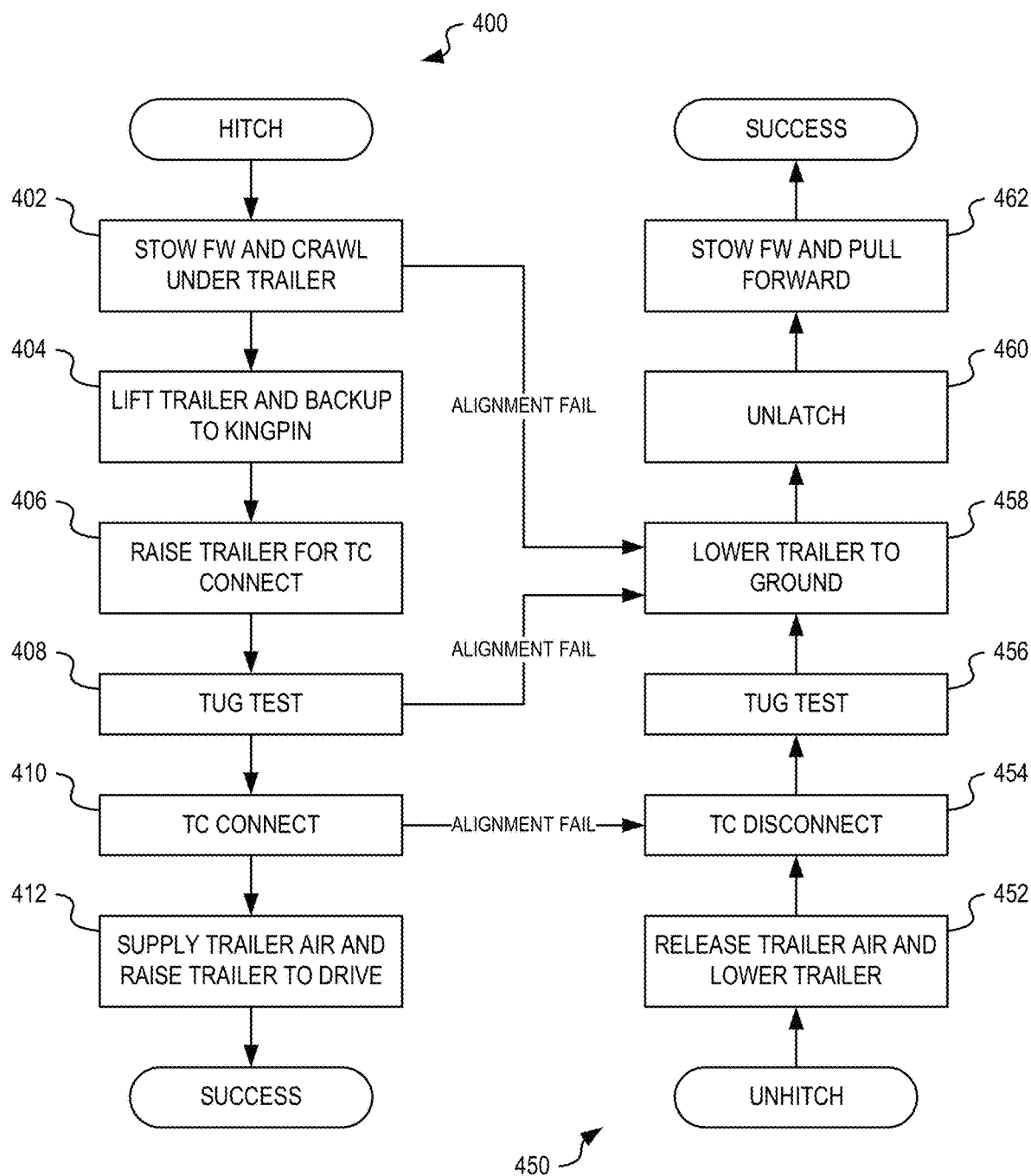
FIG. 4 shows one example hitch and unhitch sequence of states implemented by the function state machine of FIG. 2 for coupling and uncoupling the tractor and the trailer, in embodiments.

FIG. 3 is a side elevation showing tractor 104 of FIG. 1 reversing under a lower surface 302 of trailer 106. FIG. 4 shows one example hitch sequence 400 of states implemented by function state machine 226 of tractor 104, FIGS. 1-3, for coupling tractor 104 with trailer 106, and one example unhitch sequence 450 of states implemented by function state machine 226 for decoupling tractor 104 from trailer 106. FIG. 4 also shows example transitions between sequences when alignment fail is detected (e.g., when an activity of the current state fails for some reason), which allows function state machine 226 to recover from the failure (e.g., undo certain actions) and to reattempt the command. FIGS. 3 and 4 are best viewed together with the following description.

As shown in FIG. 3, landing gear 306 of trailer 106 is sufficiently extended such that a lower surface 302 (e.g., a FW plate) of a front end of trailer 106 is high enough above ground level to allow FW 222, when fully retracted, to be pushed thereunder without stalling drive motor 212 of tractor 104. That is, drive motor 212 provides sufficient force to push FW 222 under lower surface 302. However, landing gear 306 is extended by a driver of OTR tractor 108 when leaving trailer 106 in staging area 130 of autonomous yard 100, and therefore the height of lower surface 302 is at the discretion of the driver and may not be consistent between trailers 106. Further, the force required to move FW 222 under lower surface 302 is also dependent upon a weight (e.g., of goods) at the front end of trailer 106. When drive motor 212 is unable to provide sufficient force to push FW 222 beneath lower surface 302, such as when landing gear 306 is not sufficiently extended, drive motor 212 stalls.

In response to receiving a hitch command from mission controller 102, once tractor 104 is aligned with trailer 106, controller 206, in state 402, stows FW 222 and controls drive circuit 214 to move tractor 104 slowly backwards as indicated by arrow 304. When controller 206 detects that FW 222 is beneath lower surface 302 of trailer 106, drive motor 212 is stopped and function state machine 226 transitions to state 404. If controller 206 determines that tractor 104 is not correctly aligned with trailer 106, function state machine 226 transitions to state 458 of unhitch sequence 450 such that another attempt may be made. In state 404, controller 206 controls FW actuator 224 to lift trailer 106 and controls drive circuit 214 to back tractor 104, and thus FW 222, up to a kingpin 308 of trailer 106. In state 406, controller 206 controls FW actuator 224 to raise FW 222 and thereby lift the front end of trailer 106 for Trailer Connect (e.g., a process of connecting air lines/electrical from tractor 104 to trailer 106 using gladhand ID and orientation). In state 408, controller 206 controls drive circuit 214 to perform a tug test. If controller 206 determines that tractor 104 is not correctly coupled with trailer 106 (e.g., the kingpin did not latch), function state machine 226 transitions to state 458 of unhitch sequence 450 such that another attempt may be made. In state 410, controller 206 controls trailer air actuator 238 to perform the TC connect. If controller 206 determines that the TC did not connect successfully, function state machine 226 transitions to state 454 of unhitch sequence 450 such that another attempt may be made. In state 412, controller 206 controls trailer air actuator 238 to supply trailer air and controls FW actuator 224 to raise FW 222 higher to ensure that the trailer landing gear clears the ground in preparation to drive.

In response to receiving an unhitch command from mission controller1 102, once trailer 106 is correctly positioned, controller 206, in state 452, controls trailer air actuator 238 to release trailer air and controls FW actuator 224 to lower FW 222 and the front end of trailer 106. In state 454, controller 206 controls trailer air actuator 238 to disconnect the TC from trailer 106. In state 456, controller 206 controls drive circuit 214 to move tractor 104 forward to perform a tug test. In state 458, controller 206 controls FW actuator 224 to lower the front end of trailer 106 to the ground. In state 460, controller 206 controls FW actuator 224 to unlatch from the trailer kingpin. In state 462, controller 206 controls FW actuator 224 to stow FW 222 and controls drive circuit 214 to cause tractor 104 to move forward away from trailer 106.

Trailer Angle Measurement

Figure 5:
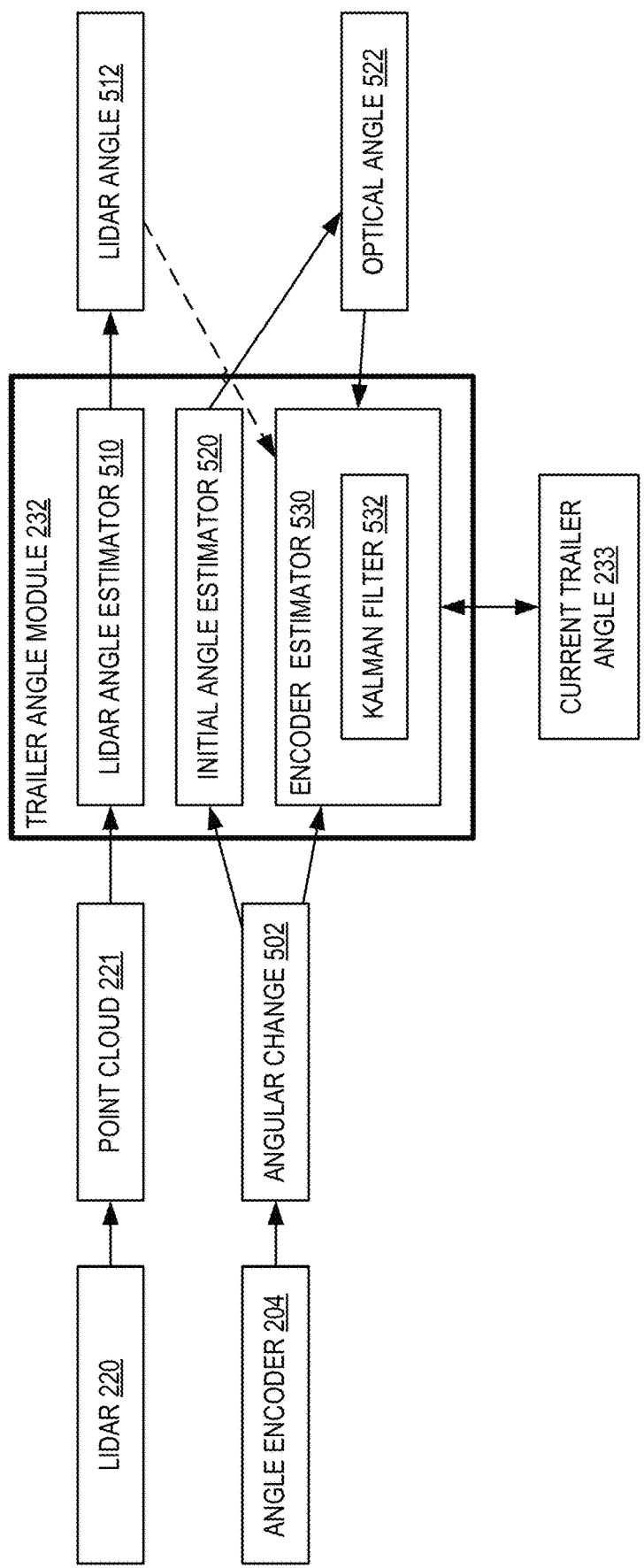
FIG. 5 shows the trailer angle module of FIG. 2 in further example detail, in embodiments.

FIG. 5 shows trailer angle module 232 of controller 206, FIG. 2, in further example detail. Trailer angle module 232 includes a LIDAR angle estimator 510 for determining a LIDAR angle 512 that estimates an angle of trailer 106 relative to tractor 104 based upon point cloud 221 captured by LIDAR 220 and including points corresponding to a front end of trailer 106. Trailer angle module 232 also includes an initial angle estimator 520 that includes algorithms for determining an optical trailer angle 522 based on angular change 502 output by trailer angle encoder 204 over a short movement of tractor 104 and trailer 106 (e.g., shortly after coupling/hitching of trailer 106 to tractor 104). Trailer angle module 232 also includes an encoder estimator 530 that updates current trailer angle 233 based on angular change 502. Encoder estimator 530 may include a Kalman filter 532 that processes LIDAR angle 512 and angular change 502 to generate current trailer angle 233. For example, Kalman filter 532 reduces noise on LIDAR angle 512. Kalman filter 532 estimates the unknown initial bias in optical trailer angle 522 (e.g., in incremental encoder data from angle encoder 204) based upon LIDAR angle 512 determined from LIDAR 220 (described below). The estimated bias is refined and removed from angular change 502 resulting in a low noise optical trailer angle 522. Further biases due to crooked tandems and/or trailers may be removed using short move calculations, described below.

Figure 6:
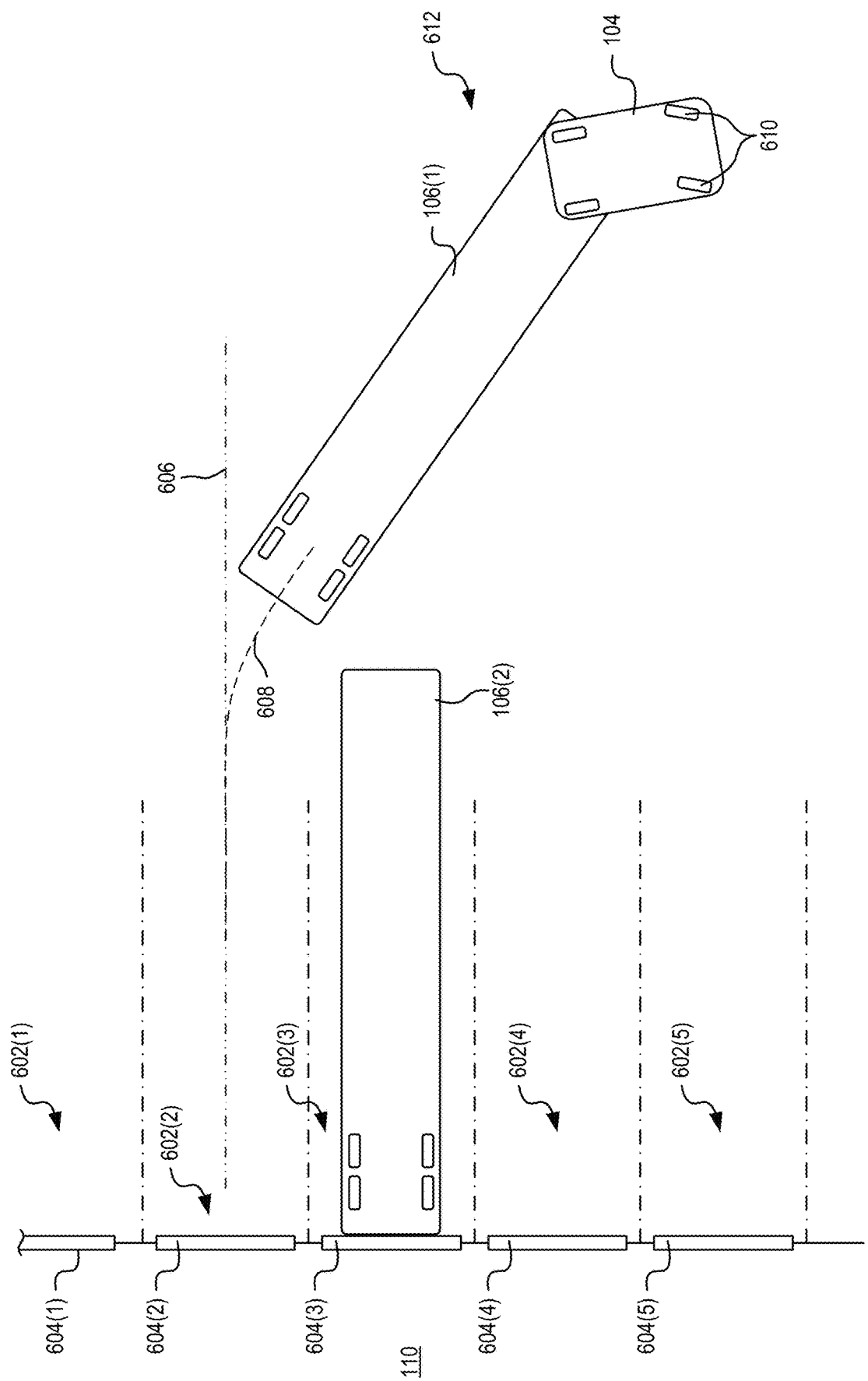
FIG. 6 is a schematic plan view illustrating the tractor of FIGS. 1-3 backing the trailer up to one of a plurality of adjacent loading docks of the warehouse of FIG. 1, in embodiments.

FIG. 6 is a schematic plan view illustrating tractor 104 backing trailer 106 up to one loading dock 602(2) of a plurality of adjacent loading docks 602(1)-(5) of warehouse 110. Tractor 104 coupled with trailer 106 may be referred to as vehicle 612. Each loading dock 602(1)-(5) has a corresponding loading door 604(1)-(5), and as shown, one trailer 106(2) is parked at loading dock 602(3). Since trailer doors are at the rear of trailer 106, trailer 106 is reversed up to loading dock 602 and is correctly aligned with loading door 604 to provide full and safe access to trailer 106. A reference path 606 may be defined for loading dock 602(2) to facilitate alignment of trailer 106(1) into loading dock 602(2). Maneuvering module 240 may predict a path 608 of trailer 106(1) when determining a steering angle 250 for steering wheels 610 of tractor 104.

Figure 7:
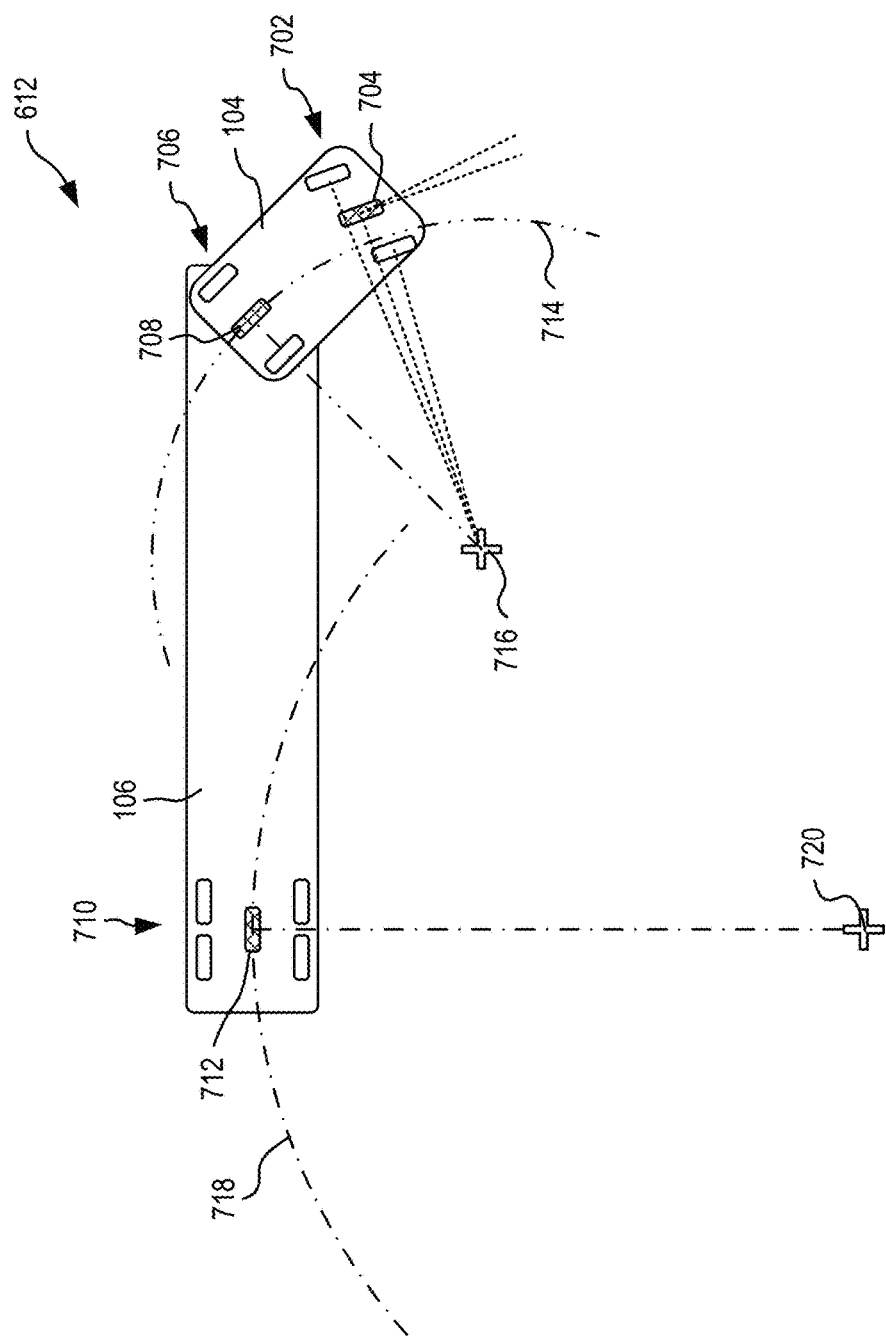
FIG. 7 is a schematic showing example assumptions made by the motion planner running in the maneuvering module of the tractor to determine the steering angle for controlling the tractor to reverse the trailer, in embodiments.

FIG. 7 is a schematic showing example assumptions made by maneuvering module 240 of tractor 104 when determining steering angle 250 for controlling tractor 104 to reverse trailer 106. For purposes of simplification, tractor 104 and trailer 106 are approximated in a kinematic bicycle model with nonholonomic constraints. A front axle 702 of tractor 104 is approximated by a single steerable modelled wheel 704 at the axle's center, a rear axle 706 of tractor 104 is approximated by a single non-steering modelled wheel 708 at the axle's center, and tandem 710 of trailer 106 is approximated as a single non-steering modelled wheel 712 centered in between both axles of tandem 710. This simplified representation of tractor 104 and trailer 106 allows any complex dynamic interactions between the actual wheels to be ignored and the nonholonomic constraint implies that none of the actual wheels move laterally. As shown in FIG. 7, tractor 104 is assumed to move along a circle 714 perpendicular to non-steering modelled wheel 708 about a tractor center of rotation 716, and trailer 106 is assumed to travel along a circle 718 perpendicular to non-steering modelled wheel 712 about a trailer center of rotation 720. This assumption is generally safe when tractor 104 and trailer 106 are moving at low speed (e.g., less than 15 miles-per-hour). Further assumptions include: tires do not deform, tires along an axle are properly aligned, and motion of the steering wheels of front axle 702 is approximated by the average angle the wheels.

However, to accurately back trailer 106 into loading dock 602(2), tractor 104 requires accurate knowledge of the position of the back end of trailer 106, and non-steering modelled wheel 712, relative to tractor 104.

FIG. 8 is a schematic diagram showing one example trailer angle encoder 800 positioned beneath FW 222 of tractor 104 and in a disengaged position as tractor 104 couples (hitches) with trailer 106. Trailer angle encoder 800 may represent trailer angle encoder 204 of FIG. 2. FIG. 9 is a schematic showing trailer angle encoder 800 of FIG. 8 in an engaged position to mechanically couple with kingpin 308 of trailer 106 while tractor 104 and trailer 106 are coupled together. Trailer angle encoder 800 measures trailer angle by mechanically coupling with kingpin 308 of trailer 106. Trailer angle encoder 800 includes an arm 802 attached via a pivot 804 to an existing flange 806 of FW 222. An optical encoder 808 is positioned at a first end, away from pivot 804, of arm 802 such that it is positioned beneath, and pivoted away from, locking jaws 810 of FW 222. Trailer angle encoder 800 includes a disc 812 mechanically coupled with an input spindle of optical encoder 808 and having a plurality (e.g., three) vertical pins 814 (e.g., spikes, teeth, knife blades perpendicular to a lower surface of kingpin 308, etc.) positioned around an upper surface of disc 812. In the example of FIG. 8, a solenoid 816 operates to compress a spring 818 and pull a second end, opposite the first end, of arm 802 such that disc 812 and pins 814 are retracted away from locking jaws 810 as tractor 104 moves beneath trailer 106, as indicated by arrow 820. Accordingly, activating solenoid 816 moves disc 812, pins 814, and optical encoder 808 away from FW 222 as kingpin 308 is captured by locking jaws 810, thereby preventing damage to trailer angle encoder 800 during coupling and decoupling of trailer 106 from tractor 104. In other embodiments, operation of solenoid 816 and spring 818 may be reversed, whereby solenoid 816 is activated to move disc 812, pins 814, and optical encoder 808 towards FW 222 when tractor 104 and trailer 106 are coupled together. Other actuators may be used in place of solenoid 816 and spring 818 to move arm 802 without departing from the scope hereof.

FIG. 9 shows trailer angle encoder 800 of FIG. 8 mechanically coupled with kingpin 308 captured by locking jaws 810 of FW 222. With kingpin 308 captured by locking jaws 810, solenoid 816 is deactivated, allowing spring 818 to push down on the second end of arm 802, which pivots about pivot 804 such that the first end of arm 802 presses pins 814 into a bottom surface (e.g., of the kingpin flange) of kingpin 308. Pins 814 may be individually spring loaded to ensure good contact when the lower surface of kingpin 308 is uneven, and are durable (e.g., made of a hardened steel or titanium) and mechanically couple with the lower surface of kingpin 308 to cause disc 812 and input shaft of optical encoder 808 to rotate as kingpin 308 rotates relative to tractor 104. For example, the input shaft of optical encoder 808 has minimal rotational resistance, and thereby follows movement of kingpin 308 through contact of pins 814. Advantageously, once trailer 106 is coupled with of tractor 104, solenoid 816 is deactivated and spring 818 maintains pressure against arm 802 and pins 814 maintain contact with kingpin 308.

Figure 11:
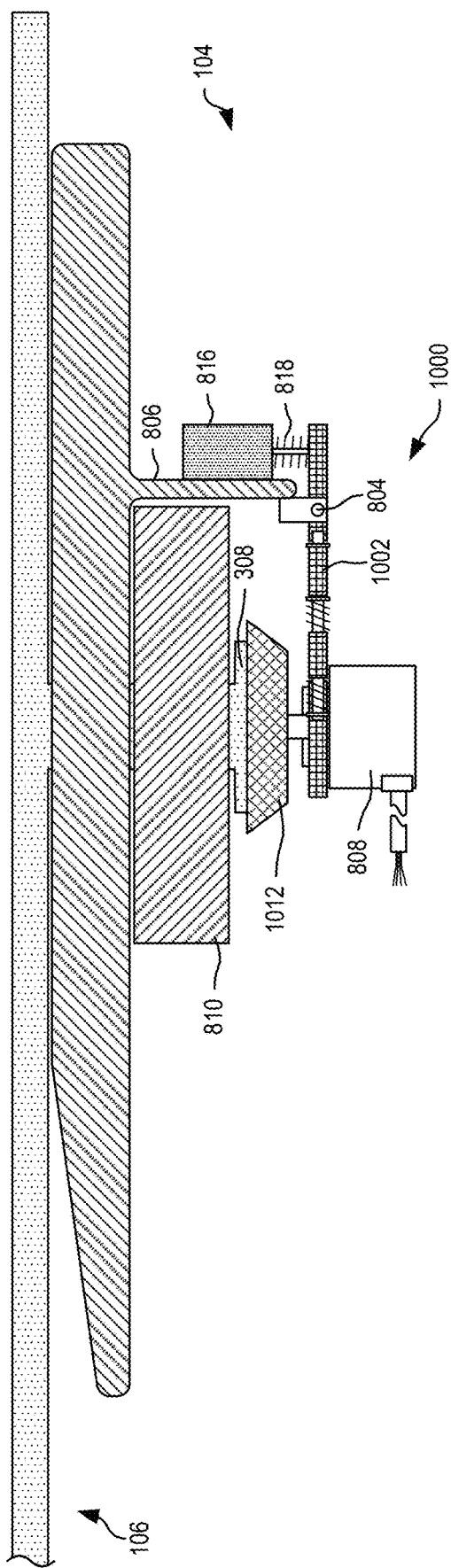
Figure 12:
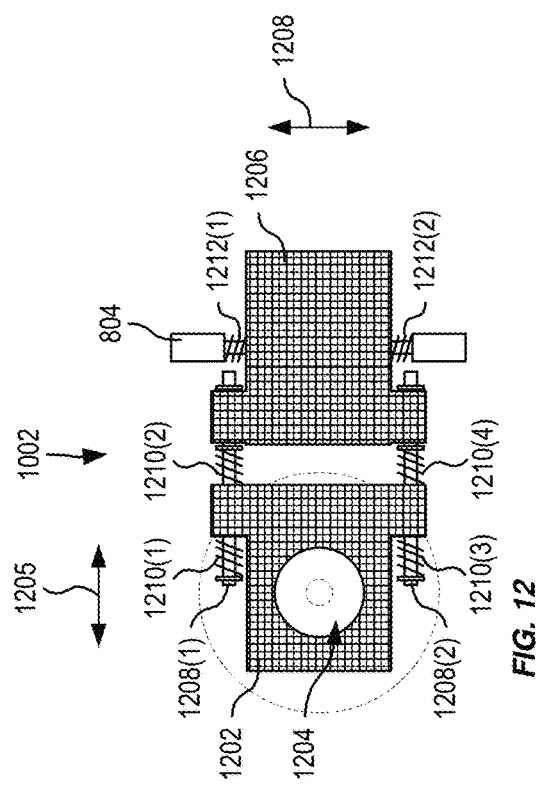

FIGS. 10-12 are schematic diagrams showing another example trailer angle encoder 1000 positioned beneath FW 222 of tractor 104 of FIG. 1. Trailer angle encoder 1000 may represent trailer angle encoder 204 of FIG. 2. FIG. 10 shows trailer angle encoder 1000 in a disengaged position as tractor 104 couples (hitches) with trailer 106 and FIG. 11 shows trailer angle encoder 1000 of FIG. 10 in an engaged position to mechanically coupled with kingpin 308 of trailer 106 while tractor 104 and trailer 106 are coupled together. FIG. 12 shows a longitudinally and laterally adjustable arm 1002 of trailer angle encoder 1000 in further detail. Trailer angle encoder 1000 is similar to trailer angle encoder 800 of FIGS. 8 and 9, except that trailer angle encoder 1000 includes a conical adapter 1012, in place of disc 812 and pins 814, for mechanically coupling with kingpin 308, and arm 802 is replaced by longitudinally and laterally adjustable arm 1002. Accordingly, only difference between trailer angle encoder 1000 and trailer angle encoder 800 will be described.

Conical adapter 1012 couples with the input shaft of optical encoder 808 and has a conical shape that tapers internally from a first diameter, nearest optical encoder 808, smaller than the diameter of the flange of kingpin 308 to a second diameter greater than the diameter of the flange of kingpin 308. Conical adapter 1012 is at least partially formed of a flexible material (e.g., rubber, polyurethane, oil resistant room-temperature-vulcanizing (RTV) silicone, etc.) that mechanically grips the flange of kingpin 308 when pressed there against to cause the input shaft of optical encoder 808 to rotate as kingpin 308 rotates relative to tractor 104. As shown in FIG. 10, solenoid 816 is activated to move conical adapter 1012 out of the path of kingpin 308 as tractor 104 couples with trailer 106. As shown in FIG. 11, once tractor 104 and trailer 106 are coupled, solenoid 816 is deactivated and conical adapter 1012 is pressed against the flange of kingpin 308 by spring 818.

As shown in FIG. 12, longitudinally and laterally adjustable arm 1002 allows both longitudinal and lateral movement to allow conical adapter 1012 to center on kingpin 308. Arm 1002 is formed of a first plate 1202 that forms an aperture 1204 for securing optical encoder 808 and a second plate 1206 that pivotably couples with pivot 804. Plates 1202 and 1206 are joined by two longitudinal shafts 1208(1) and 1208(2) that allow longitudinal movement, indicated by arrow 1205, of plate 1202 relative to plate 1206. Two springs 1210(1), 1210(2) are positioned on longitudinal shaft 1208(1), one on each side of at least part of plate 1202. Similarly, another two springs 1210(3), 1210(4) are positioned on longitudinal shaft 1208(2), one on each side of at least part of plate 1202. Accordingly, springs 1210 cause plate 1202 to return to a nominal longitudinal center position when conical adapter 1012 is decoupled from kingpin 308. Pivot 804 allows both rotation of plate 1206 around pivot 804 and lateral movement of plate 1206 along pivot 804. Two springs 1212(1) and 1212(2) are positioned on pivot 804, one on each side of at least part of plate 1206 and cause second plate 1206 to return to a nominal lateral center position when conical adapter 1012 is decoupled from kingpin 308.

In one embodiment, optical encoder 808 is a quadrature optical encoder that generates angular change 205 (e.g., a count of pulses that indicate the changing angle over time) as kingpin 308 (e.g., trailer 106) rotates relative to tractor 104. For example, with θ being an angle of trailer 106 relative to tractor 104, the quadrature encoder counter output with a 1024-line encoder is given by:

$$\theta(t) = \theta_0 + \frac{360}{4096} \text{enc\_count}$$

where $\theta_0$ is estimated by a Kalman filter.

The standard deviation of the quadrature encoder's quantization noise is:

$$\frac{\Delta}{\sqrt{12}} = \frac{\frac{360}{4096}}{\sqrt{12}} = 0.02537° \approx \frac{1}{40} \text{ degrees}$$

and the signal to noise quantization ration is:

$$20\log_{10}(2^{14}) = 84 \text{ dB}$$

Accordingly, optical encoder 808 provides a high-resolution measurement of change in the angle between trailer 106 and tractor 104. However, since the angle between tractor 104 and trailer 106 is unknown when tractor 104 couples with trailer 106, the relative change in angular position provided in angular change 502 by optical encoder 808 cannot indicate an absolute angle between tractor 104 and trailer 106.

Determining Trailer Angle Using LIDAR

FIG. 13 shows LIDAR 220 mounted on a cab portion 1300 of tractor 104 to face trailer 106. Kingpin 308 of trailer 106 is captured by FW 222, and is therefore a point of rotation of trailer 106 relative to tractor 104. FIG. 14 is a schematic illustrating example operation of LIDAR 220 to detect front corners 1302 and 1304 of trailer 106 when trailer 106 is in-line with tractor 104. FIG. 15 is a schematic illustrating example operation of LIDAR 220 to detect front corners 1302 and 1304 of trailer 106 when trailer 106 is at a twenty-degree angle to tractor 104. As shown, corners 1302 and 1304 (e.g., the front of trailer 106) rotate about kingpin 308. FIGS. 13, 14, and 15 are best viewed together with the following description.

LIDAR 220 generates point cloud 221 by scanning at least one beam 1402 of light and detecting light reflected from objects in the path of the light. LIDAR 220 is positioned on a rear facing surface of a cab portion 1300 of tractor 104 and thereby scans beam 1402 across at least a front end of trailer 106. Each point in point cloud 221 defines a distance r and an angle θ. The following discussion uses n-row column vectors (n≥2), and M and b scalers. When beam 1402 misses the front end of trailer 106, r has a high value, and thus the data may be ignored for purposes of trailer angle calculations. Accordingly, beams 1402 corresponding to corners 1302 and 1304 of trailer 106 may be easily identified in data from LIDAR 220.

The [r, θ] LIDAR data (e.g., point cloud 221) is converted into [x, Y] coordinate form, such that:

$$Y = M \cdot x + b,$$

$$Y = [x[1]]\begin{bmatrix} M \\ b \end{bmatrix},$$

$$\text{and } \begin{bmatrix} M \\ b \end{bmatrix} = ([x[1]]^T[x[1]])^{-1}[x[1]]^T Y$$

Giving:

$$TrailerAngle = \tan^{-1}(M)$$

LIDAR angle estimator 510 includes at least one algorithm that implements at least part of the equations described above to determine LIDAR angle 512 based upon point cloud 221. Advantageously, LIDAR angle estimator 510 generates LIDAR angle 512 independently of specific dynamics (e.g., length) trailer 106. In certain embodiments, LIDAR angle estimator 510 may be invoked at intervals and/or on demand to generate LIDAR angle 512 to check current trailer angle 233 generated by other means, and/or may provide input to update of current trailer angle 233.

Determining Trailer Angle Through Short Movement

In an alternative embodiment, an initial angle of trailer 106 is estimated using a Kinematic equation model, a short move of tractor 104 and trailer 106, and measured change in trailer angle by trailer angle encoder 204. The Kinematic equation model is defined as follows. Circular motion is defined as:

$$v = r * \omega$$

giving $$\dot{\phi} = \omega = \frac{v}{r}$$

where r is the circle's radius $$\left(\text{radius of curvature, curvature} = \frac{1}{r}\right).$$

Kinematic equations of tractor 104 and trailer 106 are defined as:

$$\dot{x} = v(t)\cos(\phi(t))$$
$$\dot{y} = v(t)\sin(\phi(t))$$
$$\dot{\phi} = \frac{v(t)}{r} = \frac{v(t)}{L}\tan(\delta(t))$$
$$\dot{\theta} = \frac{v(t)}{r} = -\frac{v(t)}{L_2}\sin(\theta(t) - \phi(t))$$

where x, y is position, φ is a heading of tractor 104, and θ is a heading of trailer 106.

Solving for steering angle:

$$\delta(t) = \tan^{-1}\left(\frac{L}{r}\right)$$

and solving for trailer angle (e.g., angle between tractor 104 and trailer 106):

$$\theta(t) - \phi(t) = \sin^{-1}\left(-\frac{L_2}{r}\right)$$

where L is the length of tractor 104 (e.g., the distance between single steerable modelled wheel 704 and single non-steering modelled wheel 708), and $L_2$ is the length of trailer 106 (e.g., the distance between kingpin 308 and single non-steering modelled wheel 712).

Accordingly, the radius of curvature of trailer 106 is:

$$r_{trailer} = sqrt(r^2 - L_2^2)$$

Initial angle estimator 520, FIG. 5, may implement at least one algorithm based on the above equations to determine optical trailer angle 522 based on angular change 502. Advantageously, initial angle estimator 520 operates independently of trailer specifics such as length of trailer 106. In one example of operation, initial angle estimator 520 reads trailer angle encoder 204 (e.g., to reset the quadrature encoder counter), controls tractor 104 to move a short distance, and then reads an angular change 502 from optical encoder 808. To ensure any angular change is not lost in quantization noise, the short distance moved should be at least one meter. For example, an angular change of two-and-a-half degrees would require a one-meter movement for a twenty-five-meter radius turn. Initial angle estimator 520 then calculates a current angle of trailer 106 relative to tractor 104 based on the distance moved ΔS, angular change 502, and the following equations.

$$\Delta\theta = -\frac{\Delta S}{L_2}\sin(\theta_0 + \Delta\theta - \phi_0 - \Delta\phi)$$

giving $$\theta_0 = \Delta\phi + \phi_0 - \Delta\theta + \sin^{-1}\left(-\frac{L_2\Delta\theta}{\Delta S}\right)$$

Initial angle estimator 520 may be invoked after tractor 104 couples with trailer 106 to determine optical trailer angle 522 that is used to determine an initial value for current trailer angle 233. Thereafter, encoder estimator 530 updates current trailer angle 233 based on angular changes 502 from trailer angle encoder 204 (e.g., from optical encoder 808). In certain embodiments, initial angle estimator 520 is invoked at intervals, or on demand, to validate and/or update current trailer angle 233.

In certain embodiments, encoder estimator 530 may process both angular change 502 and LIDAR angle 512 to update current trailer angle 233. Encoder estimator 530 may also process input from other means of determining current trailer angle 233, such as where trailer angle is determined from images captured by camera 218.

Mast Mounted LIDAR

In certain embodiments, LIDAR 220 may be mounted to an extensible mast on tractor 104, so that it may be raised to an elevation sufficient for it capture trailer 106 and allow current trailer angle 233 to be determined. For example, the mast may be extended after tractor 104 couples with trailer 106 and while tractor 104 is stationary, to reduce loads on the extended mast. After LIDAR data is captured, the mast may be retracted before tractor 104 moves (e.g., to remain below vehicle max height limits).

Figure 16:
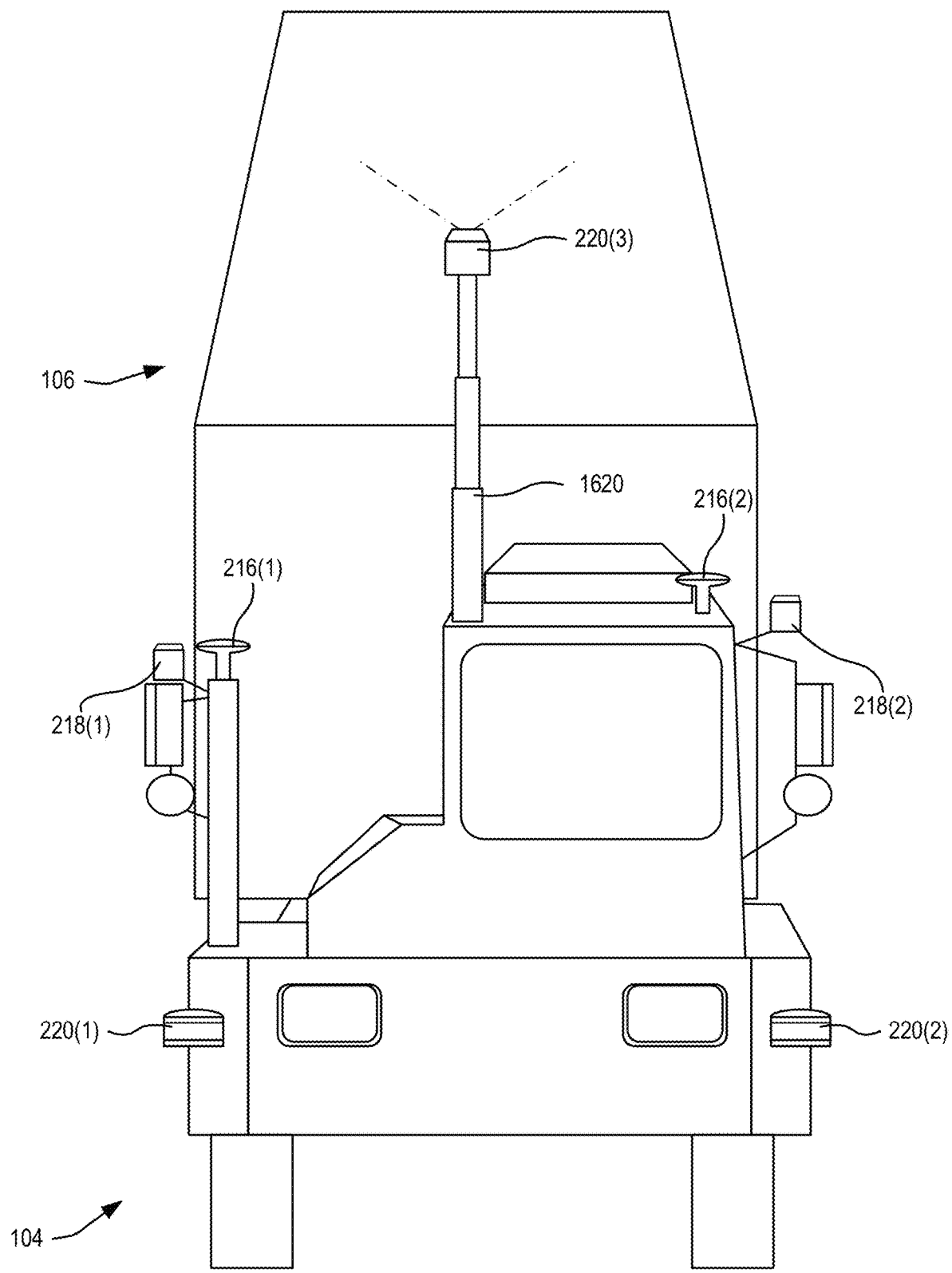
FIG. 16 is a front perspective view of the tractor coupled with the trailer of FIG. 1, showing a LIDAR mounted to an extensible mast, in embodiments.

FIG. 16 is a front perspective view of tractor 104 coupled with trailer 106, showing a LIDAR 220(3) mounted to an extensible mast 1620. In certain embodiments, mast 1620 incorporates upward facing sensors, a range finder, or similar sensors, to warn and prevent the extending mast from colliding with overhead obstructions. Further, mast 1620 may be stabilized by guy wires (not shown) that deploy from damped retracting reels and thereby reduce sway of LIDAR 220(3) when mast 1620 is extended. Similarly, horizontal extending arms may be included to extend one or more sensors (e.g., camera 218 and/or LIDAR 220) horizontally. By raising the sensors above the height of trailer 106, or away from the sides of trailer 106, the sensors are not blocked by trailer 106 and may thereby gain an improved perspective of a position of trailer 106 relative to tractor 104.

By way of example, mast 1620 may be implemented as a Rolatube™ (however, other extenders may also be used) that extends vertically, horizontally, or at some other angle, from tractor 104 to provide one or more sensors with a better (e.g., bird's eye) view of trailer 106. For example, the Rolatube may provide an extension between ten and twenty feet that would allow a sensor (e.g., camera 218 and/or LIDAR 220) a view around the side of trailer 106 at just about any backing position and angle. In certain embodiments, the extensive mast is mounted on a turret with continuous rotation about a vertical axis, and further, a second actuator may transition the turret from horizontal to vertical. The turret may include slip ring connections for power and signal.

Additionally, a motorized element at the end of the Rolatube could be used with the turret to position one or more sensors at the edge or back of a trailer such that they may look back.

Magnetically Coupled Trailer Angle Encoder

Figure 19:
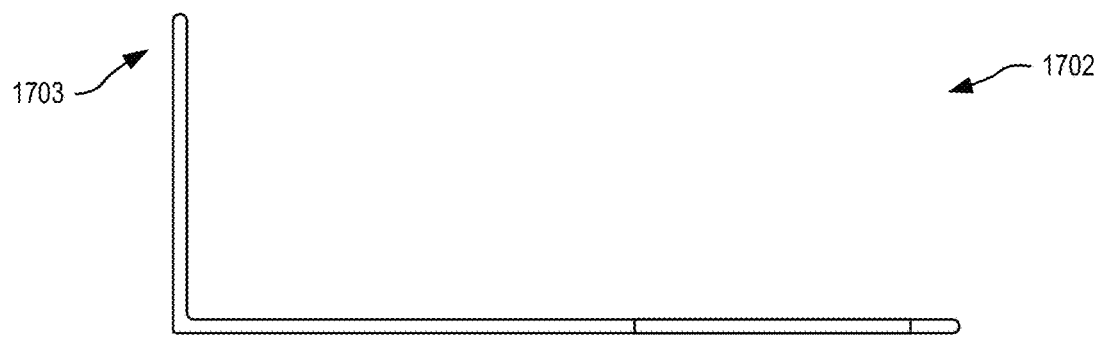
FIGS. 19, 20 and 21 shows side, top and front elevations, respectively, of the spring plate of FIGS. 17 and 18, in embodiments.
Figure 20:
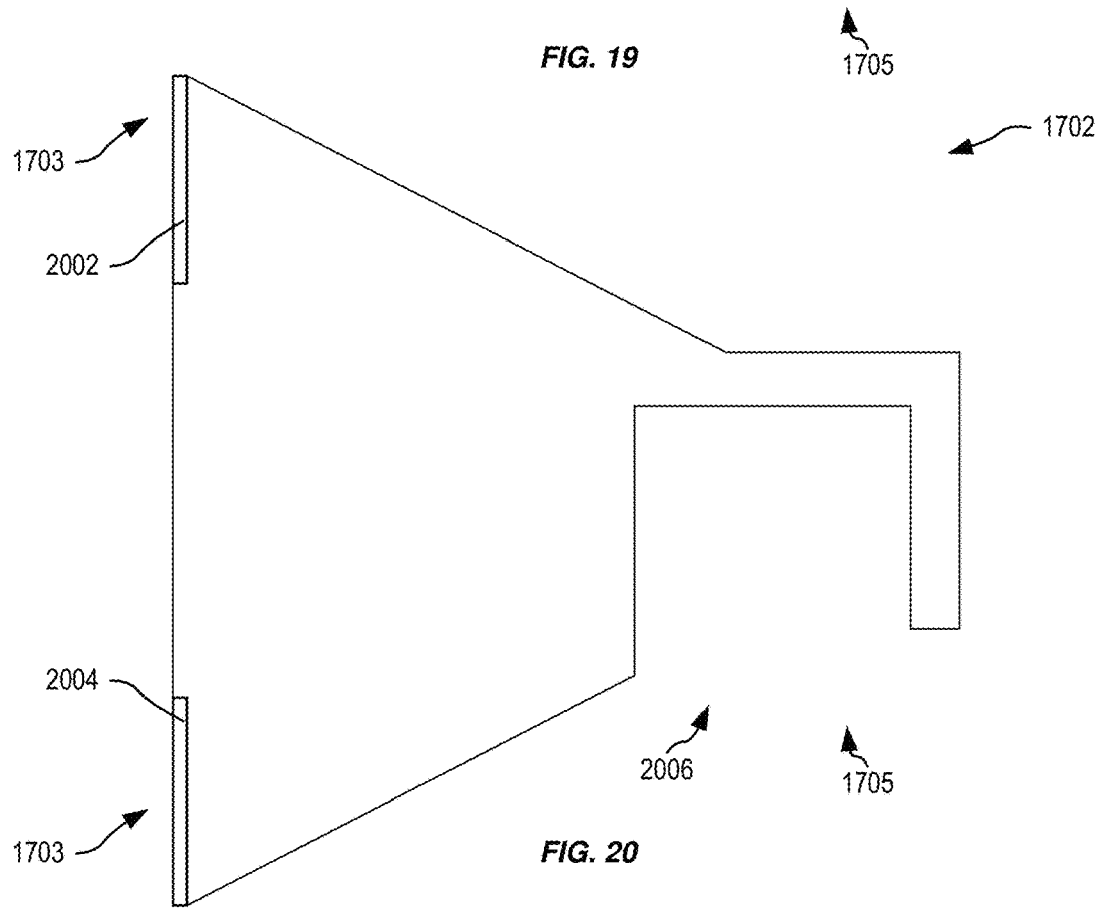
Figure 21:
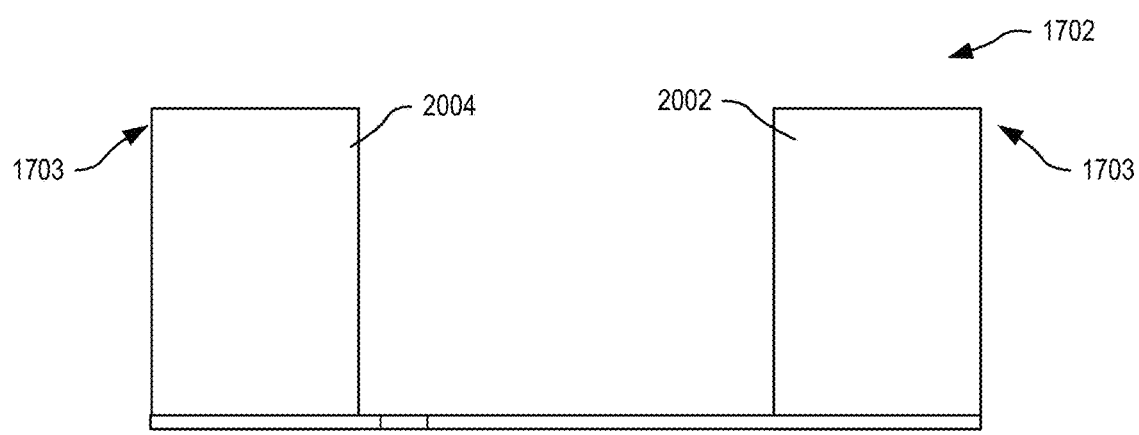
Figure 22:
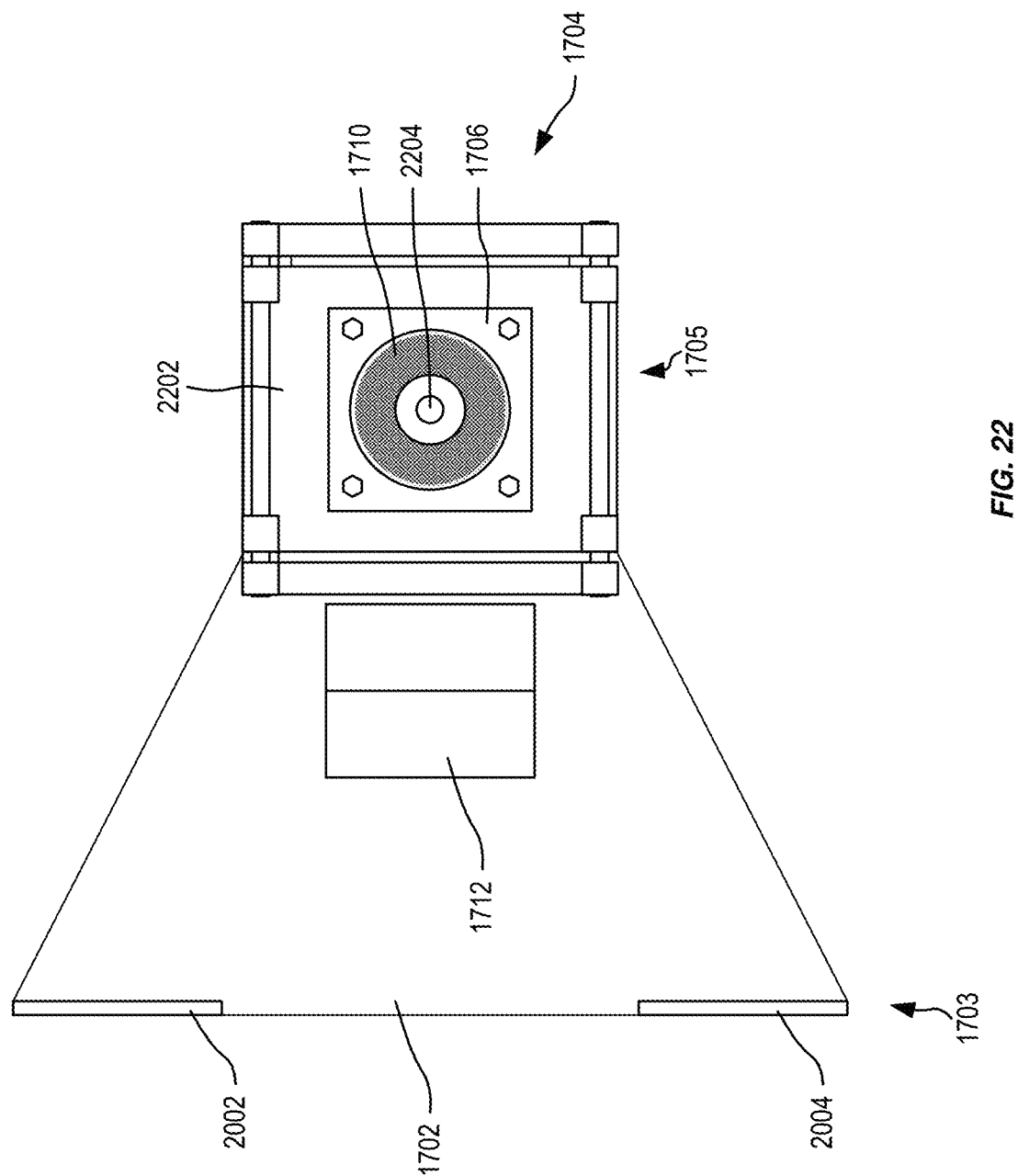
FIG. 22 is a top view of the magnetically coupled trailer angle encoder of FIGS. 17 and 18, in embodiments.
Figure 23:
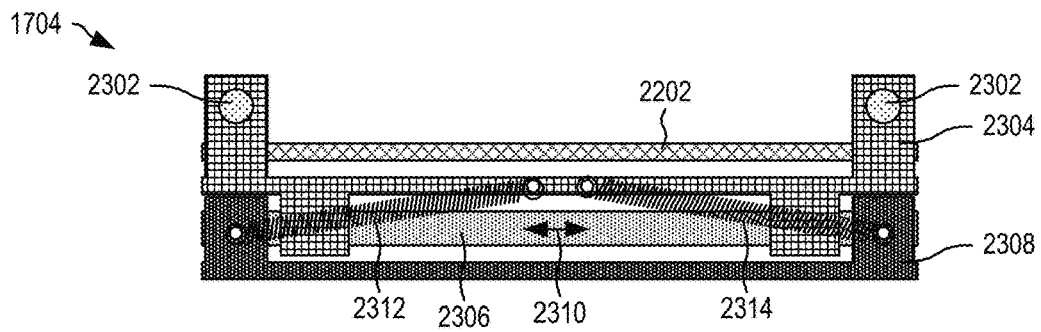
FIGS. 23, 24, and 25 are front, side, and top elevations, respectively, of the two-axis positioning table of FIGS. 17 and 18, in embodiments.
Figure 24:
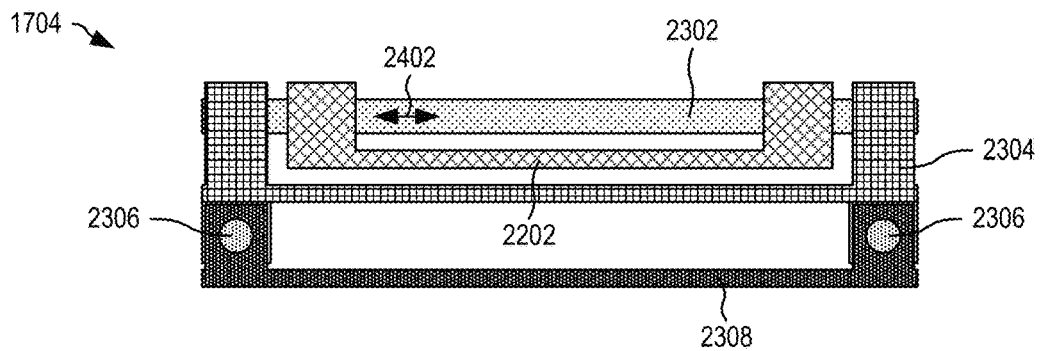
Figure 25:
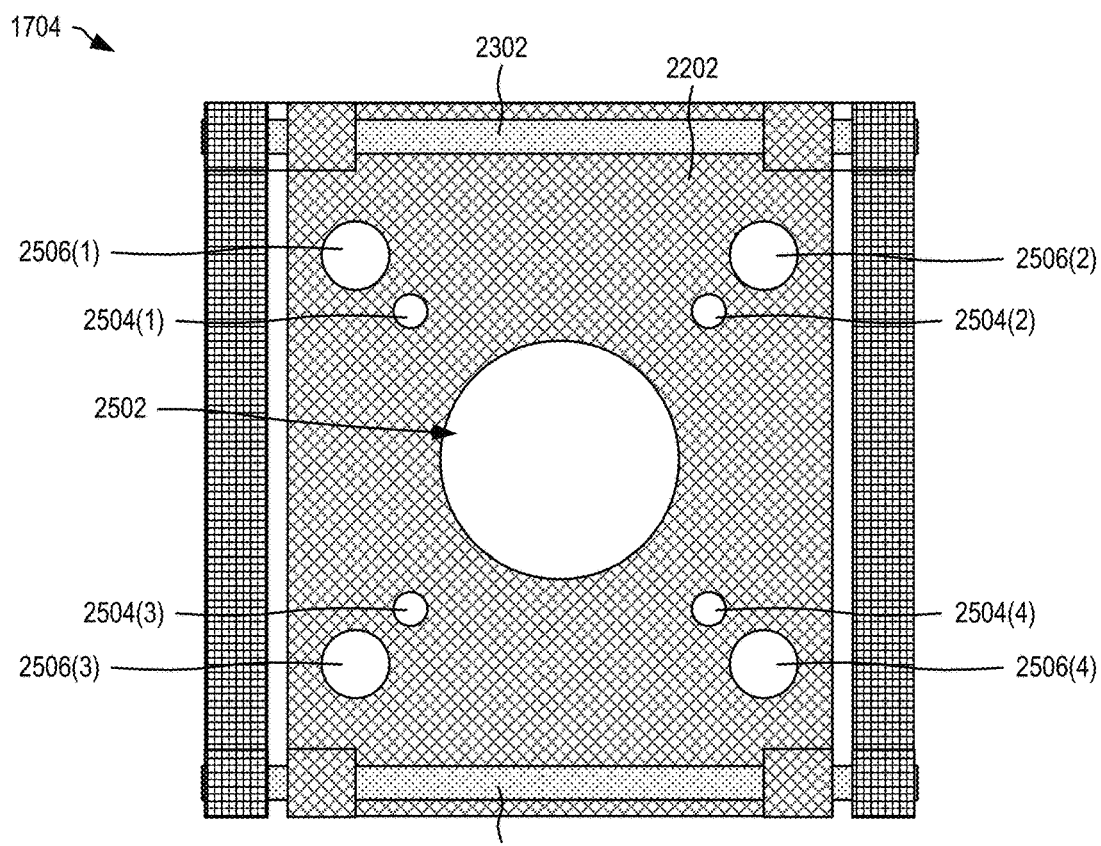

FIG. 17 is a schematic diagram showing one example magnetically coupled trailer angle encoder 1700 positioned beneath FW 222 of tractor 104 prior to tractor 104 coupling (hitching) with trailer 106. Trailer angle encoder 1700 includes a spring plate 1702, a two-axis positioning table 1704, a bearing 1706, and optical encoder 1708, a magnet 1710, and a clearance and cleaning block 1712. FIG. 18 is a schematic showing magnetically coupled trailer angle encoder 1700 of FIG. 17 magnetically coupled with kingpin 308 of trailer 106 that is hitched to tractor 104. FIGS. 19, 20 and 21 shows side, top and front elevations, respectively, of spring plate 1702 of FIGS. 17 and 18. FIG. 22 is a top view of magnetically coupled trailer angle encoder 1700. FIGS. 23, 24, and 25 are front, side, and top elevations, respectively, of two-axis positioning table 1710 of FIGS. 17 and 18. FIGS. 17-25 are best viewed together with the following description.

Trailer angle encoder 1700 is one example implementation of trailer angle encoder 204 of FIG. 2. Trailer angle encoder 1700 measures trailer angle of trailer 106 using a magnetically coupled optical encoder with kingpin 308 and thereby capturing its rotational movements relative to tractor 104. Spring plate 1702 is made from spring steel for example and attaches, at a first end 1703, to FW 222. In certain embodiments, first end 1703 of spring plate 1702 includes structure and/or fasteners that attach to a flange or other structure beneath and towards the rear (relative to tractor 104) of FW 222 without obstructing coupling of FW 222 with kingpin 308 of trailer 106. In embodiments shown in FIGS. 19-21, plate 1702 may be shaped to attach either side of a rear opening of FW 222 that receives kingpin 308.

Two-axis positioning table 1704 is attached to a second end 1705 of spring plate 1702, opposite to first end 1703, whereby spring plate 1702 positions two-axis positioning table 1704 beneath locking jaws 810 of FW 222. Two-axis positioning table 1710 movably supports bearing 1706 and a shaft of optical encoder 1708 passes through bearing 1706 and rigidly attaches to magnet 1710. Accordingly, magnet 1710 is positioned beneath locking jaws 810 such that it attached to kingpin 308 when kingpin 308 is captured by locking jaws 810.

Clearance and cleaning block 1712 is a block with slopes forming a ridge and is positioned immediately behind two-axis positioning table 1704. In certain embodiments, block 1712 is solid and made of durable plastic or rubber with a height 1713 that is greater than a height 1711 of a top surface of magnet 1710, with respect to spring plate 1702. Block 1712 has two functions: (a) it cleans a bottom surface of kingpin 308 as tractor 104 moves beneath trailer 106 during hitching, and (b) it depresses spring plate 1702 as kingpin 308 moved across it and forces it downward, there preventing kingpin 308 from impacting a side of magnet 1710. As tractor 104 moves under trailer 106, block 1712 wipes dirt from the bottom surface of kingpin 308 and moves off of kingpin 308 as kingpin 308 is seated within FW 222 and locked into place by locking jaws 810. As kingpin 308 moves off block 1712, spring plate 1702 returns to its nominal position and an upper surface of magnet 1710 contacts the (cleaned) lower surface of kingpin 308.

Since kingpin 308 is steel, magnet 1710 magnetically adhered to kingpin 308. Two-axis positioning table 1710 allows minor offsets in alignment of the shaft of optical encoder 1708 and the rotational center of kingpin 308, and for movement of kingpin 308 relative to tractor 104 during maneuvering of trailer 106. For example, forces applied by tractor 104 to move trailer 106 may result in small lateral movements of kingpin 308 relative to FW 222.

A magnetic force attracts magnet 110 to kingpin 308 resulting in friction between the bottom surface of kingpin 308 and a top surface of magnet 1710. Rotation of kingpin 308 relative to FW 222 (e.g., tractor 104) results in an angular force applied to magnet 1710 that is greater than any combined angular resistance of bearing 1706 and optical encoder 1708. Accordingly, rotation of kingpin 308 results in rotation of optical encoder 1708.

As shown in FIGS. 19-21, first end 1703 of spring plate 1702 may form two folded lugs 2002 and 2004 that are spaced to attach to the structure beneath and to the rear of FW 222 without blocking ingress of kingpin 308 into locking jaws 810. Spring plate 1702 may also form a notch 2006 at second end 1705 that receives optical encoder 1708, which extends below two-axis positioning table 1710 and allows electrical connection therewith. Notch 2006 may have other shapes and sizes without departing from the scope hereof.

As shown in FIGS. 22-25, two-axis positioning table 1710 has a top platform 2202 that forms a first aperture 2502 and four mounting holes 2504(1)-(4) for coupling with optical encoder 1708. Top platform 2202 also has four mounting holes 2506(1)-(4) for attaching bearing 1706 to top platform 2202. Top platform 2202 slidably attaches to two parallel transverse rods 2302 that allow top platform 2202 to slide as indicated by arrow 2402. A middle structure 2304 supports transverse rods 2302 and attaches to two parallel transverse rods 2306 that are perpendicular to transverse rods 2302 and that allows middle structure 2304 to move as indicated by arrow 2310. Transverse rods 2306 are supported by a bottom structure 2308 that fixedly attaches to spring plate 1702. Accordingly, relative to spring plate 1702, top platform 2202 has lateral movement, indicated by arrows 2402 and 2310, but is unable to rotate.

In certain embodiments, as shown in FIG. 23, two-axis positioning table 1710 includes two springs 2312 and 2314 that each have first ends attached near a center of one side of middle structure 2304 and opposite ends attaches to opposite ends, respectively, of the same side of bottom structure 2308. Springs 2312 and 2314 operates to center middle structure 2304 on bottom structure 2308 when no forces are applied to top platform 2202. Forces applied by springs 2312 and 2314 are less than a force required to move magnet 1710 against kingpin 308. That is, springs 2312 and 2314 center middle structure 2304 on bottom structure 2308 until magnet couples with kingpin 308.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

Combination of Features

Features described above as well as those claimed below may be combined in various ways without departing from the scope hereof. The following enumerated examples illustrate some possible, non-limiting combinations:

(A1) A trailer angle encoder for determining an angle between a tractor and a trailer coupled thereto includes: an arm coupled at a pivot with a flange located beneath a fifth-wheel of the tractor; an optical encoder positioned at a first end of the arm and having a rotatable shaft with a mechanical coupler; and wherein the arm is positioned to mechanically couple the mechanical coupler with a kingpin of the trailer.

(A2) The embodiment (A1) further including a solenoid mechanically coupled with the flange and operable to move a second end of the arm against a spring.

(A3) In either one of embodiments (A1) or (A2), the solenoid causing the arm to disengage the mechanical coupler from the kingpin, and the spring causing the arm to engage the mechanical coupler with the kingpin when the solenoid is deactivated.

(A4) In any one of embodiments (A1)-(A3), the solenoid causing the arm to engage the mechanical coupler with the kingpin.

(A5) In any one of embodiments (A1)-(A4), the mechanical coupler including: a disc mechanically coupled to the rotatable shaft; and a plurality of pins distributed around a first side of the disc and each pin having a point that mechanically engages with a bottom surface of the kingpin.

(A6) In any one of embodiments (A1)-(A5), the mechanical coupler including a conical adapter fixedly coupled with the rotatable shaft and having a conical shape that tapers internally from a first diameter, nearest the optical encoder, smaller than a diameter of a flange of the kingpin, to a second diameter greater than the diameter of the flange.

(A7) In any one of embodiments (A1)-(A6), the conical adapter being at least partially formed of a flexible material that mechanically grips the flange when pressed there against.

(A8) In any one of embodiments (A1)-(A7), the arm including: a first plate forming the first end; a second plate coupled with the pivot; at least one longitudinal shaft coupling the first plate with the second plate and allowing longitudinal movement of the first plate relative to the second plate; and the longitudinal movement allows the conical adapter to longitudinally center on the flange.

(A9) Any one of embodiments (A1)-(A8) further including at least two springs positioned on the longitudinal shaft to return the first plate to a nominal longitudinally central position when the conical adapter disengages with the flange.

(A10) In any one of embodiments (A1)-(A9), the pivot including a lateral shaft that further allows lateral movement of the second plate, where in the lateral movement allows the conical adapter to laterally center on the flange.

(A11) Any one of embodiments (A1)-(A10) further including at least two springs positioned on the lateral shaft to return the second plate to a nominal laterally central position when the conical adapter disengages with the flange.

(A12) In any one of embodiments (A1)-(A11), the first plate forming an aperture for securing the optical encoder.

(B1) A method for determining an angle between a tractor and a trailer that are coupled together includes: controlling, from a controller of the tractor, the tractor to pull the trailer a short distance; determining, from an optical encoder mounted on the tractor and mechanically coupled with the trailer, a change in angle between the tractor and the trailer; and calculating the angle between the tractor and the trailer based on the change in angle.

(B2) In embodiments of (B1), the step of calculating including evaluating the formula:

$$\theta_0 = \Delta\phi + \phi_0 - \Delta\theta + \sin^{-1}(-\frac{L_2 \Delta\theta}{\Delta S})$$

where $\phi$ is a heading of the tractor, $\theta$ is a heading of the trailer, and $L_2$ is a length of the trailer, and $\Delta S$ is a distance moved.

(C1) A trailer angle encoder for determining an angle between a tractor and a trailer coupled thereto includes: a spring plate for coupling at a first end with an underside of a fifth-wheel of the tractor; an optical encoder attached to the spring plate; a magnet mounted to a rotatable shaft of the optical encoder; and a clearance and cleaning block positioned on the spring plate to interact with a bottom surface of a kingpin of the trailer during hitching of the tractor to the trailer; wherein the magnet magnetically couples with the bottom surface of the kingpin when the tractor is hitched to the trailer.

(C2) In embodiments of (C1), the spring plate positioning the magnet beneath the kingpin.

(C3) Either one of embodiments (C1) or (C2) further including a two-axis positioning table mounted to the spring plate and having a platform that supports the optical encoder.

(C4) In any one of embodiments (C1)-(C3), the platform providing limited two-axis movement of the optical encoder and the magnet relative to the fifth-wheel.

(C5) Any one of embodiments (C1)-(C4) further including a bearing supported by the platform and coupled with the rotatable shaft of the optical encoder.

(C6) Any one of embodiments (C1)-(C5) further including at least two springs to cause the platform to return to a nominal laterally central position when the magnet is not magnetically coupled with the kingpin.

(C7) In any one of embodiments (C1)-(C6), the clearance and cleaning block having a height greater than a height of a top surface of the magnet and causing the kingpin to depress the clearance and cleaning block during hitching of the tractor to the trailer such that the spring plate is flexed downwards to prevent the kingpin contacting the side of the magnet.

(C8) In any one of embodiments (C1)-(C7), the clearance and cleaning block being positioned to stop interaction of the magnet with the kingpin prior to capture of the kingpin by the fifth-wheel.

(C9) In any one of embodiments (C1)-(C8), the interaction of the clearance and cleaning block with the bottom surface of the kingpin wiping dirt from the bottom of the kingpin.

(D1) A software product includes instructions, stored on non-transitory computer-readable media, wherein the instructions, when executed by a processor, perform steps for determining an angle between a tractor and a trailer that are coupled together, includes: instructions for controlling, from a controller of the tractor, the tractor to pull the trailer a short distance; instructions for determining, from an optical encoder mounted on the tractor and mechanically coupled with the trailer, a change in angle between the tractor and the trailer; and instructions for calculating the angle between the tractor and the trailer based on the change in angle.

(E1) A method for determining an angle between a tractor and a trailer that are coupled together includes: capturing, within a controller of the tractor, a point cloud using a rear facing LIDAR positioned on the tractor; converting points of the point cloud corresponding to front corners of the trailer to coordinate form; and calculating the angle between the tractor and the trailer based upon the coordinates of the front corners of the trailer.

(E2) In embodiments of (E1), the step of converting including converting the points to coordinate form such that:

$$Y = M \cdot x + b, \; Y = [x[1]]\begin{bmatrix} M \\ b \end{bmatrix}, \text{ and } \begin{bmatrix} M \\ b \end{bmatrix} = ([x[1]]^T[x[1]])^{-1}[x[1]]^T Y$$

where x, Y is a coordinate, and M and b are scalers.

(F1) A software product includes instructions, stored on non-transitory computer-readable media, wherein the instructions, when executed by a processor, perform steps for determining an angle between a tractor and a trailer that are coupled together, includes: instructions for capturing, within a controller of the tractor, a point cloud using a rear facing LIDAR positioned on the tractor; instructions for converting points of the point cloud corresponding to front corners of the trailer to coordinate form; and instructions for calculating the angle between the tractor and the trailer based upon the coordinates of the front corners of the trailer.

What is claimed is:

1. A method for determining a LIDAR-based angle between an autonomous tractor and a trailer that are coupled together, comprising:
    capturing, within a controller of the tractor, a point cloud using a rear facing LIDAR positioned on the tractor;
    converting points of the point cloud corresponding to front corners of the trailer to coordinate form; and calculating the LIDAR-based angle between the tractor and the trailer based upon the coordinates of the front corners of the trailer.

2. The method of claim 1, the converting comprising converting the points to coordinate form such that:

$$Y = M \cdot x + b, Y = [x[1]]\begin{bmatrix} M \\ b \end{bmatrix}, \text{and } \begin{bmatrix} M \\ b \end{bmatrix} = ([x[1]]^T [x[1]])^{-1} [x[1]]^T Y,$$

where x, Y is a coordinate, and M and b are scalers.

3. The method of claim 1, further comprising determining an encoder-based angle between the autonomous tractor and the trailer by:
controlling, from the controller of the tractor, the tractor to pull the trailer a short distance;
determining, from an encoder mounted on the tractor and mechanically coupled with the trailer, a change in angle between the tractor and the trailer; and
calculating the encoder-based angle between the tractor and the trailer based on the change in angle.

4. The method of claim 3, the calculating the encoder-based angle comprising evaluating a formula:

$$\theta_0 = \Delta\phi + \phi_0 - \Delta\theta + \sin^{-1}\left(-\frac{L_2 \Delta\theta}{\Delta S}\right),$$

where $\phi$ is a heading of the tractor, $\theta$ is a heading of the trailer, and $L_2$ is a length of the trailer, and $\Delta S$ is a distance moved.

5. The method of claim 3, further comprising calculating a current trailer angle using both the encoder-based angle and the LIDAR-based angle.

6. The method of claim 5, the calculating the current trailer angle using both the encoder-based angle and the LIDAR-based angle including implementing a Kalman filter to process the LIDAR-based angle and the change in angle to generate the current trailer angle.

7. The method of claim 5, the calculating the current trailer angle using both the encoder-based angle and the LIDAR-based angle including implementing a Kalman filter that estimates initial bias in the encoder-based angle based on the LIDAR-based angle.

8. The method of claim 5, the calculating a current trailer angle further using image data captured by a camera.

9. The method of claim 1, further comprising calculating a current trailer angle using the LIDAR-based angle and images captured by a camera.

10. A system determining a LIDAR-based angle between an autonomous tractor and a trailer that are coupled together, comprising:
a LIDAR for capturing a point cloud about the tractor, the LIDAR being rear-facing with respect to the tractor and the point cloud including points corresponding to front corners of the trailer; and,
a controller configured to:
convert the points of the point cloud corresponding to front corners of the trailer to coordinate form, and
calculate the LIDAR-based angle between the tractor and the trailer based upon the coordinates of the front corners of the trailer.

11. The system of claim 10, the LIDAR being mounted on a cap portion of the tractor.

12. The system of claim 10, the LIDAR being mounted on an extensible mast.

13. The system of claim 12, further comprising an upward-facing sensor that provide mast-data used by the controller to prevent extending the extensible mast into overhead obstructions identified within the mast-data.

14. The system of claim 10, the controller further using one or both of image data and encoder data in conjunction with the coordinates to calculate a current trailer angle.

15. The system of claim 10, wherein the controller is configured to convert the points to coordinate form such that:

$$\theta_0 = \Delta\phi + \phi_0 - \Delta\theta + \sin^{-1}\left(-\frac{L_2 \Delta\theta}{\Delta S}\right),$$

where x, Y is a coordinate, and M and b are scalers.

16. The system of claim 10, the controller is further configured to calculate a current trailer angle using both encoder-based angle and the LIDAR-based angle.

17. The system of claim 16, the controller configured to calculate the current trailer angle using both the encoder-based angle and the LIDAR-based angle using at least a Kalman filter to process the LIDAR-based angle and a change in angle to generate the current trailer angle.

18. The system of claim 16, the controller configured to calculate the current trailer angle using a Kalman filter that estimates initial bias in the encoder-based angle based on the LIDAR-based angle.

19. The system of claim 10, the controller configured to calculate a current trailer angle further using image data captured by a camera.

20. The system of claim 19, the camera being mounted on the extendable mast.

* * * * *